(12) United States Patent
Kishiyama et al.

(10) Patent No.: US 8,149,686 B2
(45) Date of Patent: Apr. 3, 2012

(54) BASE STATION APPARATUS, MOBILE STATION APPARATUS AND SYNCHRONIZATION CHANNEL TRANSMISSION METHOD

(75) Inventors: Yoshihisa Kishiyama, Yokosuka (JP); Satoshi Nagata, Yokosuka (JP); Motohiro Tanno, Yokohama (JP); Kenichi Higuchi, Yokohama (JP); Mamoru Sawahashi, Yokohama (JP)

(73) Assignee: NTT DoCoMo, Tokyo (JP)

( * ) Notice: Subject to any disclaimer, the term of this patent is extended or adjusted under 35 U.S.C. 154(b) by 124 days.

(21) Appl. No.: 12/673,318

(22) PCT Filed: Aug. 12, 2008

(86) PCT No.: PCT/JP2008/064466
§ 371 (c)(1),
(2), (4) Date: Feb. 12, 2010

(87) PCT Pub. No.: WO2009/022695
PCT Pub. Date: Feb. 19, 2009

(65) Prior Publication Data
US 2011/0044159 A1 Feb. 24, 2011

(30) Foreign Application Priority Data
Aug. 14, 2007 (JP) .................................. 2007-211593

(51) Int. Cl.
*H04J 11/00* (2006.01)
(52) U.S. Cl. ........ 370/208; 370/350; 370/503; 375/149; 455/342; 455/502; 455/507; 709/248
(58) Field of Classification Search .................. 370/208, 370/320, 503, 350; 375/149; 455/502, 507, 455/342; 709/248
See application file for complete search history.

(56) References Cited

U.S. PATENT DOCUMENTS

| | | | | |
|---|---|---|---|---|
| 7,272,376 | B1 * | 9/2007 | Sparr et al. .................... | 455/342 |
| 7,577,115 | B2 * | 8/2009 | Jang .............................. | 370/320 |
| 2002/0044538 | A1 * | 4/2002 | Lee ............................... | 370/332 |
| 2006/0146740 | A1 * | 7/2006 | Sheynman et al. ........... | 370/312 |
| 2009/0279634 | A1 * | 11/2009 | Dabak et al. .................. | 375/267 |

FOREIGN PATENT DOCUMENTS
JP 2008-141741 A 6/2008
(Continued)

OTHER PUBLICATIONS
NTT DoCoMo, et al., "Investigation on P-SCH Specific Scrambling Sequences for S-SCH," 3GPP TSG RAN WG1 Meeting #50, R1-073683, Athens, Greece, Aug. 20-24, 1007, 4 pages.
(Continued)

*Primary Examiner* — Aung S Moe
*Assistant Examiner* — Vincelas Louis
(74) *Attorney, Agent, or Firm* — Osha Liang LLP

(57) ABSTRACT

A base station apparatus is disclosed for use in a mobile communication system including multiple cells having multiple sectors. The base station apparatus includes a synchronization channel generation unit configured to generate a synchronization channel for use in cell search by a user apparatus and a transmitting unit configured to wirelessly transmit a signal including the synchronization channel. The synchronization channel includes a primary synchronization channel and a secondary synchronization channel. The primary synchronization channel includes multiple types of sequences, and the secondary synchronization channel transmitted in a sector of a cell includes a code derived from a predefined generation polynomial equation corresponding to the primary synchronization channel.

25 Claims, 15 Drawing Sheets

FOREIGN PATENT DOCUMENTS

WO 2009020017 A1 2/2009

OTHER PUBLICATIONS

Motorola, "Scrambling Method for Two S-SCH Short Code," 3GPP TSG RAN WG1 Meeting #49bis, R1-072661, Orlando, Florida, USA, Jun. 25-29, 2007, 4 pages.
NTT DoCoMo, et al., "S-SCH Structure for E-UTRA Downlink," 3GPP TSG RAN WG1 Meeting #49bis, R1-072941, Orlando, USA, Jun. 25-29, 2007, 6 pages.
NTT DoCoMo, et al., "S-SCH Structure for E-UTRA Downlink," 3GPP TSG RAN WG1 Meeting #49, R1-072414, Kobe, Japan, May 7-11, 2007, 6 pages.
Patent Abstracts of Japan, Publication No. 2008-141741, dated Jun. 19, 2008, 1 page.
S. Nagata, et al., "OFDM Musen Access o Mochiiru Evolved UTRA ni Okeru Doki Channel Keiretsu no Hyoka," (also identified as 'Investigation of Synchronization Channel Sequences in OFDM Based Evolved UTRA Downlink') IEICE Technical Report, Jul. 12, 2007, vol. 107, No. 147, pp. 119 to 124, 6 pages.
NTT DoCoMo, et al., "Scrambling Method for S-SCH in E-UTRA Downlink," 3GPP TSG RAN WG1 Meeting #49bis, R1-072940, Orlando, USA, Jun. 25-29, 2007, 4 pages.
3GPP TR 25.814 V7.0.0, Jun. 2006, "Physical Layer Aspects for Evolved Universal Terrestrial Radio Access (UTRA)," 126 pages.
TSG-RAN WG1 #46bis, R1-062990, "Outcome of cell search drafting session," Seoul, Korea, Oct. 9-13, 2006, 2 pages.
3GPP TSG RAN WG1 46bis, R1-062636, "Cell Search Performance in Tightly Synchronized Network for E-UTRA," Seoul, Korea, Oct. 9-13, 2006, 8 pages.
3GPP TSG-RAN WG1 #47-bis, R1-070428, "Further analysis of initial cell search for Approach 1 and 2—single cell scenario," Sorrento, Italy, Jan. 15-19, 2007, 10 pages.
3GPP TS 36.211 V1.0.0, Mar. 2007, "Physical Channels and Modulation," 30 pages.
3GPP TSG-RAN WG1 LTE Ad Hoc Meeting, R1-060042, "SCH Structure and Cell Search Method in E-UTRA Downlink," Helsinki, Finland, Jan. 23-25, 2006, 9 pages.
3GPP TSG-RAN WG1 #48-bis, R1-071584, "Secondary Synchronization Signal Design," Malta, Mar. 26-30, 2007, 7 pages.
3GPP TSG RAN1 #48-bis, R1-071794, "Way forward for stage 2.5 details of SCH," St. Julian's, Malta, Mar. 26-30, 2007, 1 page.
D. Chu, "Polyphase Codes With Good Periodic Correlation Properties," IEEE Transactions on Information Theory, Jul. 1972, vol. II-18, pp. 531-532, 2 pages.
R. Frank, et al., "Phase Shift Pulse Codes With Good Periodic Correlation Properties," IRE Transactions on Information Theory, vol. IT-8, pp. 381-382, Oct. 1962, 4 pages.
M. Golay, "Complementary Series," IRE Transactions on Information Theory, vol. 7, pp. 82-87, Apr. 1961, 3 pages.
3GPP TSG RAN WG1 #46bis, R1-062487, "Hierarchical SCH signals suitable for both (FDD and TDD) modes of E-UTRA," Seoul, Korea, Oct. 9-13, 2006, 4 pages.
3GPP TSG RAN WG1 Meeting #47bis, R1-070146, "S-SCH Sequence Design," Sorrento, Italy, Jan. 15-19, 2007, 5 pages.
3GPP TSG-RAN WG1#49, R1-072093, "Details on SSC sequence design," May 7-11, 2007, Kobe, Japan, 5 pages.
International Search Report issued in PCT/JP2008/064466, mailed on Nov. 18, 2008, with translation, 9 pages.
Written Opinion issued in PCT/JP2008/064466, mailed on Nov. 18, 2008, , 3 pages.
Japanese Office Action for Application No. 2007-211593, mailed on Dec. 1, 2009 (7 pages).
QUALCOMM Europe, Details on SSC Sequence Design, 3GPP TSG-RAN WG1 #49-bis R1-072727, Jul. 25-29, 2007, pp. 1-7.

\* cited by examiner

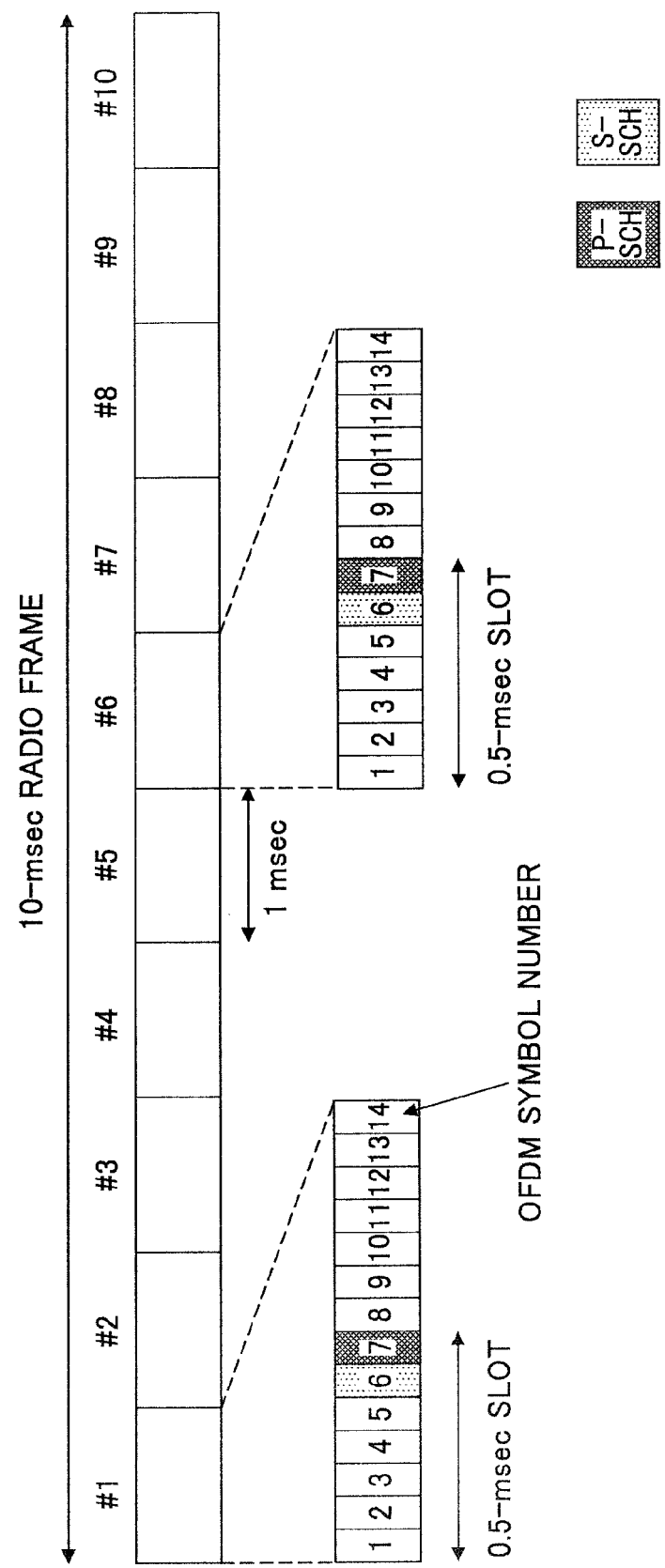

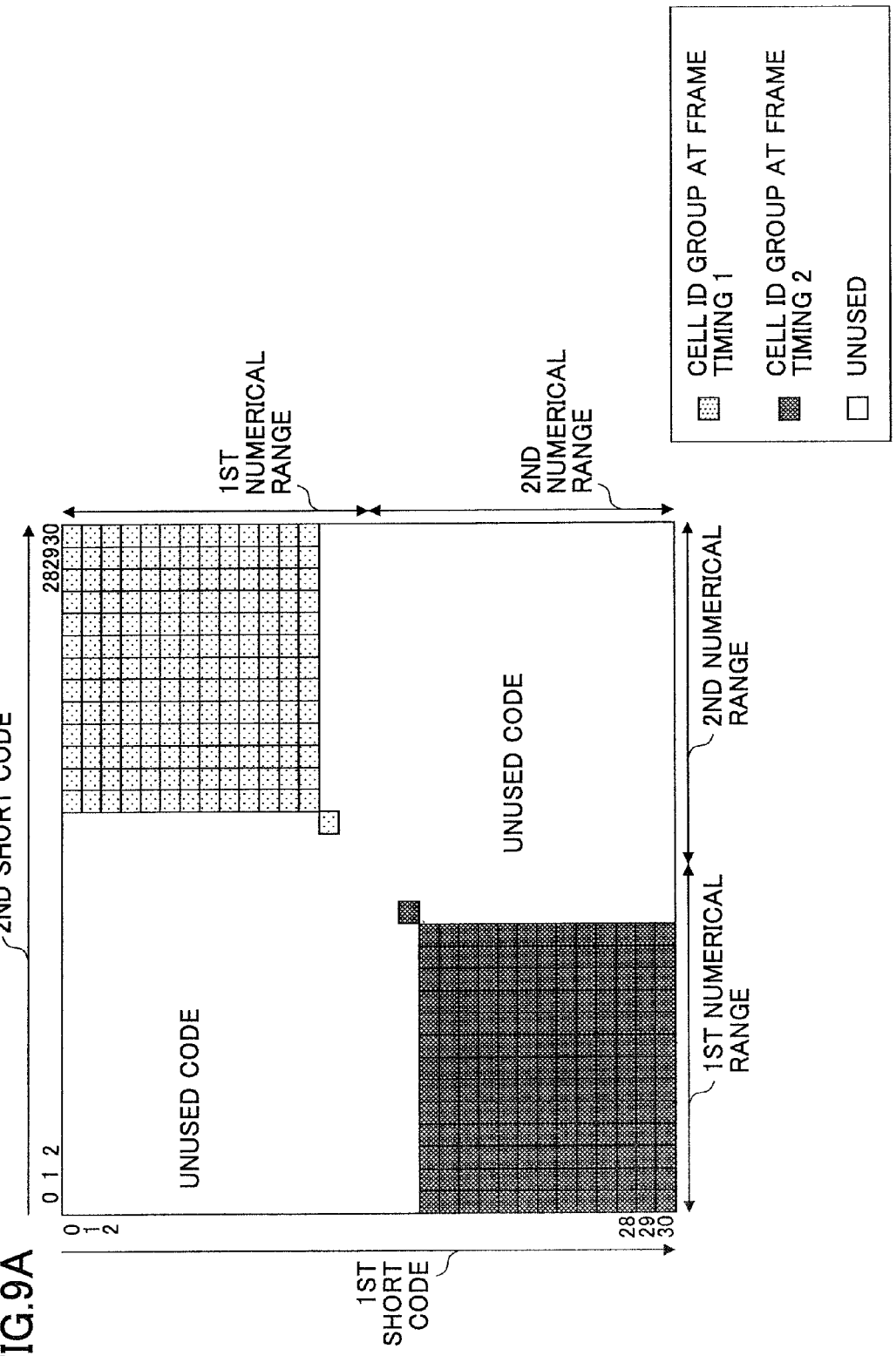

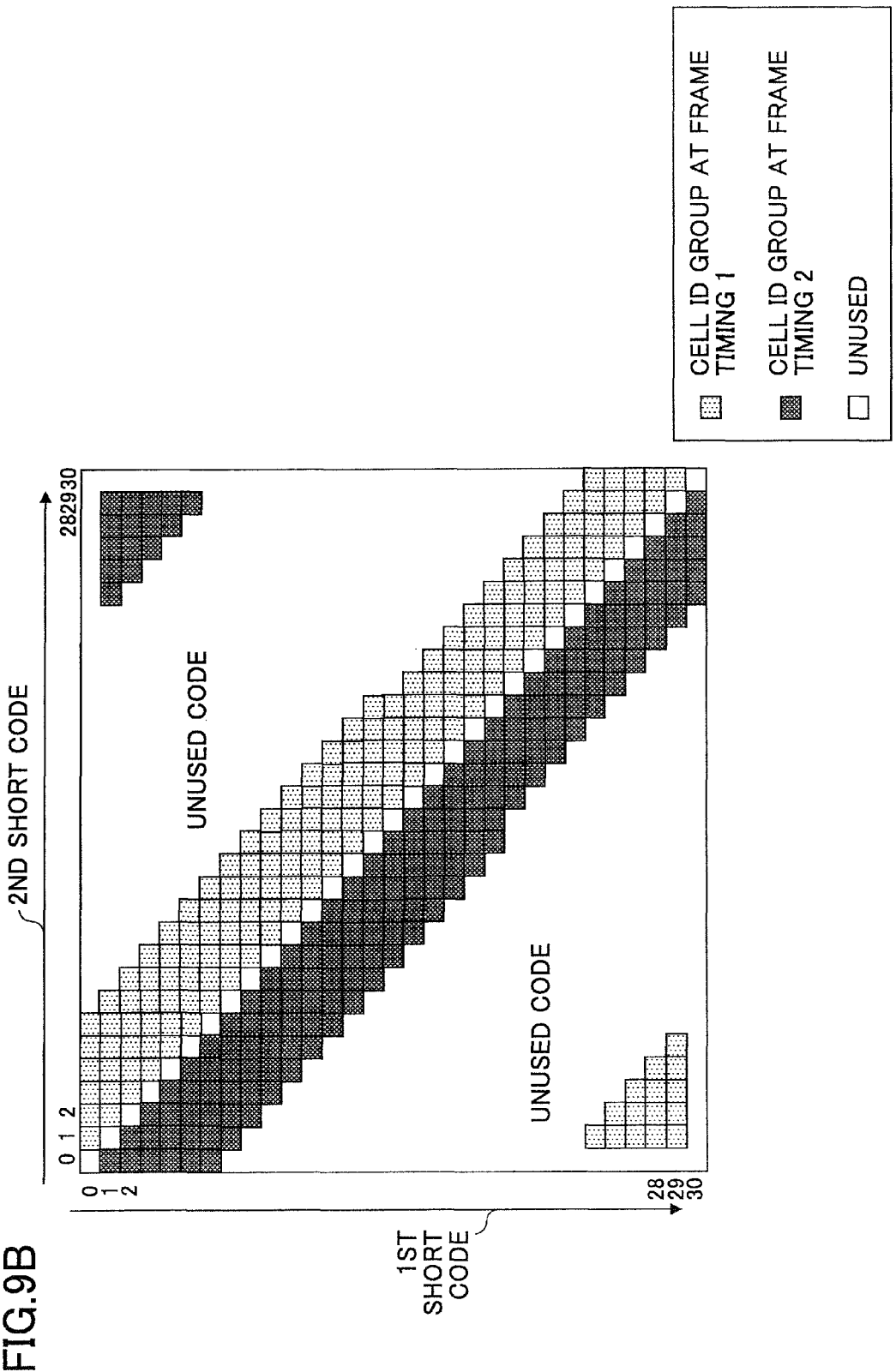

FIG.14
<CONVENTIONAL EXAMPLE>
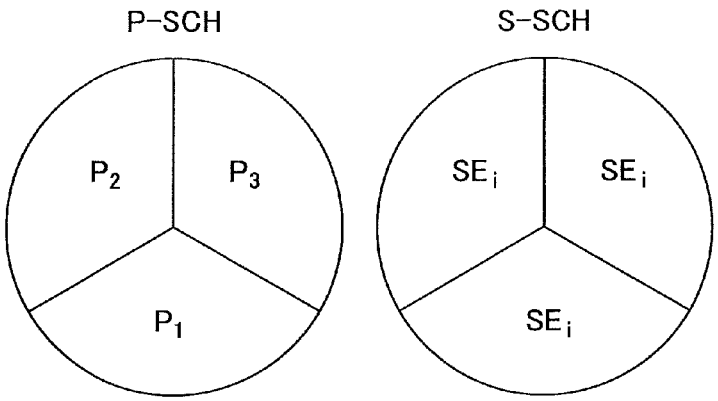
<EMBODIMENTS 1, 2>
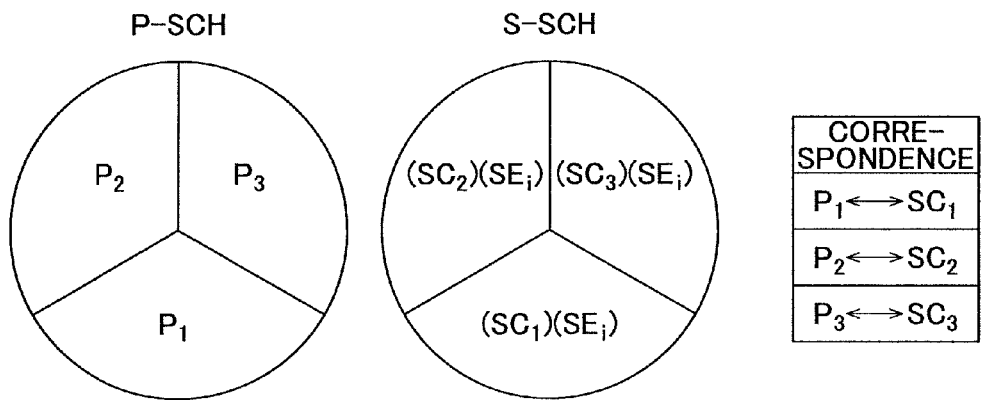
<EMBODIMENT 3>
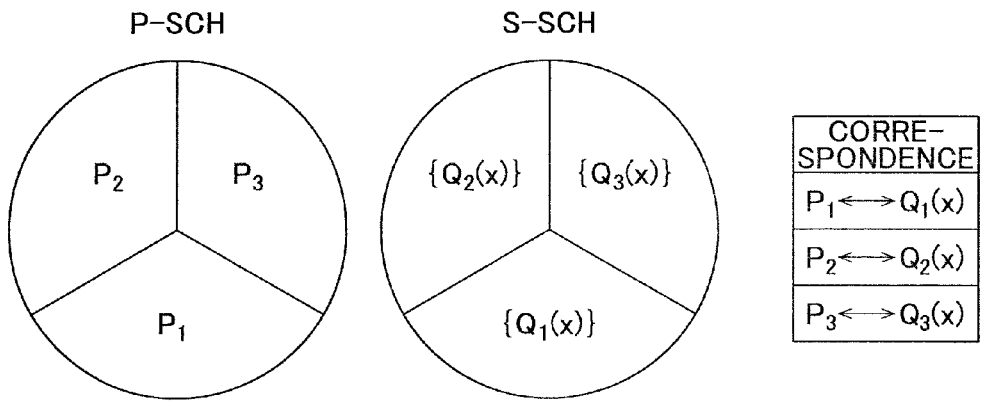

BASE STATION APPARATUS, MOBILE STATION APPARATUS AND SYNCHRONIZATION CHANNEL TRANSMISSION METHOD

TECHNICAL FIELD

The present invention relates to a radio communication system where OFDM (Orthogonal Frequency Division Multiplexing) is applied in downlinks, and particularly relates to a base station apparatus, a mobile station apparatus and a synchronization channel transmission method.

BACKGROUND ART

A successor communication scheme LTE (Long Term Evolution) to W-CDMA and HSDPA has been discussed in W-CDMA standardization group 3GPP, and OFDM and SC-FDMA (Single-Carrier Frequency Division Multiple Access) are being discussed as radio access schemes for downlinks and uplinks, respectively. For example, see 3GPP TR 25.814 (V7.0.0) "Physical Layer Aspects for Evolved UTRA" (June 2006).

The OFDM is a transmission scheme where a frequency band is segmented into multiple smaller frequency bands (subcarriers) and data is transferred over the respective frequency bands. The subcarriers are densely arranged without mutual interference while they are overlapped, which can realize fast transmission and improve utilization efficiency of frequency.

The SC-FDMA is a transmission scheme where a frequency band is segmented and the segmented different frequency bands are used for multiple terminals for transmissions, resulting in reduction in interference among the terminals. In the SC-FDMA, transmit power has small variations, which can reduce power consumption of the terminals and realize broad coverage.

In the LTE, two types of CP, long CP and short CP in different lengths, are provided for the OFDM as CP (Cyclic Prefix) for reducing influence of inter-symbol interference due to delay waves. For example, the long CPs are applied in cells with large cell radii or at transmissions of MBMS (Multimedia Broadcast Multicast Service) signals while the short CPs are applied in cells with small cell radii. In the case where the long CPs are applied, six OFDM symbols are included in a single slot. In the case where the short CPs are applied, on the other hand, seven OFDM symbols are included in a single slot.

Meanwhile, a mobile station must generally detect a cell providing the mobile station with better radio quality in a radio communication system using the W-CDMA, the LTE or others based on synchronization signals or others at power up, during standby, during communications or at intermittent reception in communications. This process is referred to as cell search in a sense that a cell to be connected to in radio links is searched for. A cell search method is determined based on a time duration required for the cell search and processing load for mobile stations in the cell search. In other words, the cell search method must be performed with a less time duration required for the cell search and less processing load for mobile stations in the cell search.

In the W-CDMA, two types of synchronization signals, P-SCH (Primary SCH) and S-SCH (Secondary SCH) are used for the cell search. Also in the LTE, it is being discussed that the two types of synchronization signals P-SCH and S-SCH are used for the cell search.

For example, one cell search method where a P-SCH having one sequence and a S-SCH having multiple sequences are transmitted every 5 ms is being discussed. For example, see R1-062990 "Outcome of cell search drafting session". In this method, downlink reception timings from cells are identified based on the P-SCH while received frame timings are detected and cell specific information such as cell IDs or cell groups (group IDs) is identified based on the S-SCH transmitted in the same slot. In general, a channel estimation value derived from the P-SCH can be used to demodulate and decode the S-SCH. For grouping of cell IDs, a cell ID for the relevant cell is then determined among cell IDs belonging to the detected cell group ID. For example, the cell ID may be derived based on a signal pattern of a pilot signal. As another example, the cell ID may be derived based on the demodulation and decoding of the P-SCH and the S-SCH. Alternatively, the cell ID may be included as an information element of the S-SCH without the grouping of cell IDs. In this case, the mobile station can detect the cell ID at the time point of the demodulation and decoding of the S-SCH.

In the case where the above-mentioned cell search method is applied, however, S-SCHs transmitted in different sequences from multiple cells may be demodulated and decoded in an inter-station synchronous system, where signals from the different cells are synchronized with each other, based on channel estimation values derived from P-SCHs transmitted in the identical sequences from the cells, which may degrade transmission characteristics for the S-SCHs. The transmission characteristics herein include a time period required for the cell search. On the other hand, in an inter-station asynchronous system where signals from different cells are not synchronized with each other, reception timings of the P-SCHs transmitted from the multiple cells are different from each other, and thus the above-mentioned problem cannot be arise.

In order to avoid the above-mentioned S-SCH characteristic degradation in the inter-station synchronous system, it is being discussed to apply a cell search method where two or more P-SCH sequences, for example, three or seven P-SCH sequences, are used. For example, see R1-062636 "Cell Search Performance in Tightly Synchronized Network for E-UTRA". Alternatively, some methods for transmitting P-SCHs at different transmission intervals for cells have been proposed to avoid the S-SCH characteristic degradation in the inter-station synchronous system. For example, see R1-070428 "Further analysis of initial cell search for Approach 1 and 2—single cell scenario". In this method, P-SCHs having different reception timings from multiple cells can be used for demodulating and decoding S-SCHs, which can prevent the above-mentioned S-SCH characteristic degradation.

Meanwhile, it is desirable that a larger number of P-SCH sequences as proposed in the document R1-062636 or more kinds of P-SCH transmission intervals as proposed in the document R1-070428 be used in view of cell design. If a small number of P-SCH sequences or less kinds of P-SCH transmission intervals are used, there is a higher likelihood that the P-SCHs sequences are the same in adjacent cells or there is a higher likelihood that the P-SCH transmission intervals are the same in adjacent cells, which may lead to a higher likelihood that the S-SCH characteristics may degrade in an inter-station synchronous system.

In addition, the above-mentioned time period required for the cell search, that is, the cell search transmission characteristics and processing load of mobile stations for the cell search have a trade-off relationship. Thus, it can be preferably selected through parameter configuration or operational manner which of the cell search transmission characteristics or the mobile station processing load for the cell search is considered to be more important.

DISCLOSURE OF INVENTION

Problem to be Solved by the Invention

However, the above-mentioned background technique has some problems as follows.

As stated above, a synchronization channel (SCH) serves as downlink signaling for cell search. It is concluded that a hierarchical SCH is applied to the synchronization channel. For example, see 3GPP TS 36.211 V1.0.0 (2007-03). Specifically, the synchronization channel consists of two sub-channels, a primary synchronization channel (P-SCH) and a secondary synchronization channel (S-SCH).

In the secondary synchronization channel, cell specific information such as cell ID groups, radio frame timings and the number of transmit antennas is transmitted. User apparatuses detect the cell specific information through detection of sequences of the secondary synchronization channels.

As stated above, in the W-CDMA (Wideband Code Division Multiple Access) scheme, adjacent cells are searched for in handover, but the cell specific information on the adjacent cells (adjacent cell information) is transmitted to a user apparatus before the adjacent cell search. In the adjacent cell search where handover target cells are detected during communication or standby, if the adjacent cell information is transmitted beforehand, candidates of the cell specific information to be detected can be reduced. In the LTE system, however, it cannot be concluded at the present that the adjacent cell information is transmitted.

As one mapping method for secondary synchronization channel sequences, a method for mapping different sequences with respect to the frequency direction has been proposed. For example, see 3GPP R1-060042 "SCH Structure and Cell Search Method in E-UTRA Downlink" and 3GPP R1-071584 "Secondary Synchronization Signal Design". For example, subcarriers of orthogonal sequence 1 ($P_1(0), P_1(1), \ldots, P_1(31)$) and orthogonal sequence 2 ($P_2(0), P_2(1), \ldots, P_2(31)$) may be alternately mapped one after the other, as illustrated in FIG. 1. Also, for example, orthogonal sequence 1 ($P_1(0), P_1(1), \ldots, P_1(31)$) and orthogonal sequence 2 ($P_2(0), P_2(1), \ldots, P_2(31)$) may be mapped into successive subcarriers, as illustrated in FIG. 2. In this manner, if several separate sequences are used, a larger number of patterns can be transmitted. Specifically, if one type of sequence having sequence length 64 is used, for example, 64 types of patterns can be transmitted. On the other hand, if two types of sequences having sequence length 32 are used as illustrated in FIG. 2, 1024 types of patterns can be transmitted.

It has been concluded that several synchronization channel sequences, for example, three types of Zadoff-Chu sequences, are to be used for the P-SCH while binary sequences are to be used for the S-SCH and that the sequences are combinations of two types of short codes. For example, see 3GPP TS 36.211 V1.0.0 (2007-03) and 3GPP R1-071794.

In the case where the S-SCH sequences are used, it is recognized that there is a risk of increase in PAPR (Peak-to-Average Power Ratio) particularly in a 1.25 MHz system.

Also, the P-SCH and the S-SCH are transmitted in the same subframe of 1 ms, and the subframe including the P-SCH and the S-SCH occurs every 5 ms. In other words, the synchronization channel is transmitted every 5 ms. User apparatuses derive channel estimation values in resident sectors through reception of the different P-SCHs for the individual sectors, perform channel compensation for the different S-SCHs for the individual cells based on the channel estimation values, and demodulate the S-SCH for cell search. The terms "cell" and "sector" are used herein synonymously with each other without confusion, but the term "cell" may mean that it includes multiple "sectors" as needed. In an inter-station synchronous system where signals from different cells are synchronized, a mobile station receives the signals from the multiple cells simultaneously. A user residing near a boundary of sectors belonging to the same base station can determine the sectors through reception of different P-SCHs for the individual cells. However, since S-SCHs from the individual cells are common, the S-SCHs would be received as a composite signal from both the sectors. It is hard to perform channel compensation for the S-SCHs based on only the channel estimation values in the resident sectors. For this reason, a detection likelihood of the S-SCHs may be reduced. In the case where each cell transmits the same S-SCH every 5 ms, interference may arise every 5 ms, which may reduce the detection likelihood of the S-SCH in the mobile station.

Thus, one object of the present invention is to improve the detection likelihood of the S-SCH in cell search.

Means for Solving the Problem

In one aspect of the present invention, a base station apparatus for use in a mobile communication system including multiple cells having multiple sectors is used. The base station apparatus includes a synchronization channel generation unit configured to generate a synchronization channel for use in cell search by a user apparatus and a transmitting unit configured to wirelessly transmit a signal including the synchronization channel. The synchronization channel includes a primary synchronization channel and a secondary synchronization channel. The primary synchronization channel includes multiple types of sequences, and the secondary synchronization channel transmitted in a sector of a cell includes a code derived from a predefined generation polynomial equation corresponding to the primary synchronization channel.

Advantage of the Invention

According to the embodiment of the present invention, it is possible to improve the detection likelihood of the S-SCH in cell search.

BRIEF DESCRIPTION OF DRAWINGS

FIG. 8 schematically illustrates an exemplary definition of a synchronization signal transmission pattern;

FIG. 9A illustrates an exemplary S-SCH sequence determination method;
FIG. 9B illustrates another exemplary S-SCH sequence determination method;
FIG. 14 illustrates a SCH transmission method.

Figure 1:
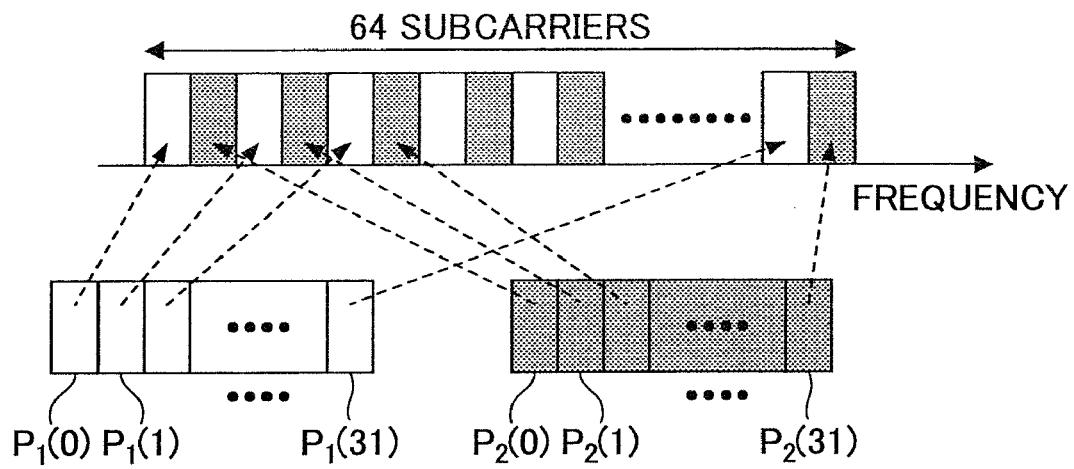
FIG. 1 schematically illustrates a mapping method for S-SCH sequences.
Figure 2:
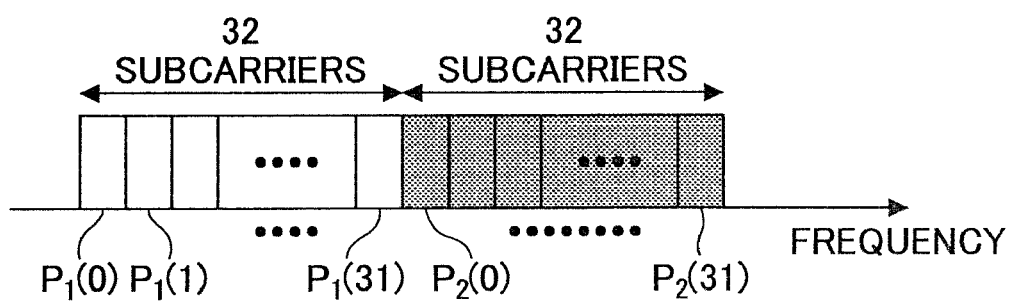
FIG. 2 schematically illustrates another mapping method for S-SCH sequences.

LIST OF REFERENCE SYMBOLS $50_k$ ($50_1$, $50_2$, $50_3$): cell
$100_n$ ($100_1$, $100_2$, $100_3$, $100_4$, $100_5$): mobile station
102: basic waveform correlation unit
104: synchronization signal replica generation unit
106: code sequence multiplication unit
108: upper layer code correlation unit
110: timing detection unit
112: S-SCH detection unit
$200_m$ ($200_1$, $200_2$, $200_3$): base station apparatus
202: transmit and receive antenna
204: amplification unit
206: transmitting and receiving unit
208: baseband signal processing unit
209: synchronization signal generation unit
210: call processing unit
212: channel interface
$208_1$: RLC processing unit
$208_2$: MAC processing unit
$208_3$: encoding unit
$208_4$: data modulation unit
$208_5$: multiplexing unit
$208_6$: serial to parallel conversion unit
$208_7$: multiplier
$208_8$: multiplier
$208_8$: scramble code generation unit
$208_{10}$: amplitude adjustment unit
$208_{11}$: combination unit
$208_{12}$: inverse Fourier transform unit
$208_{13}$: CP addition unit
$209_1$: synchronization signal control unit
$209_2$: synchronization signal generation unit
$209_3$: data modulation unit
$209_4$: serial to parallel conversion unit
$209_5$: multiplier
$209_5$: amplitude adjustment unit
252: P-SCH generation unit
254: S-SCH generation unit
256: multiplier
258: scramble sequence generation unit
260: multiplexing unit
300: access gateway apparatus
400: core network
1000: radio communication system

BEST MODE FOR CARRYING OUT THE INVENTION

Embodiments of the present invention are described with reference to the drawings in detail below. Throughout the drawings, elements having the same functions are designated by the same symbols, and descriptions thereof are not repeated.

First Embodiment

Figure 3:
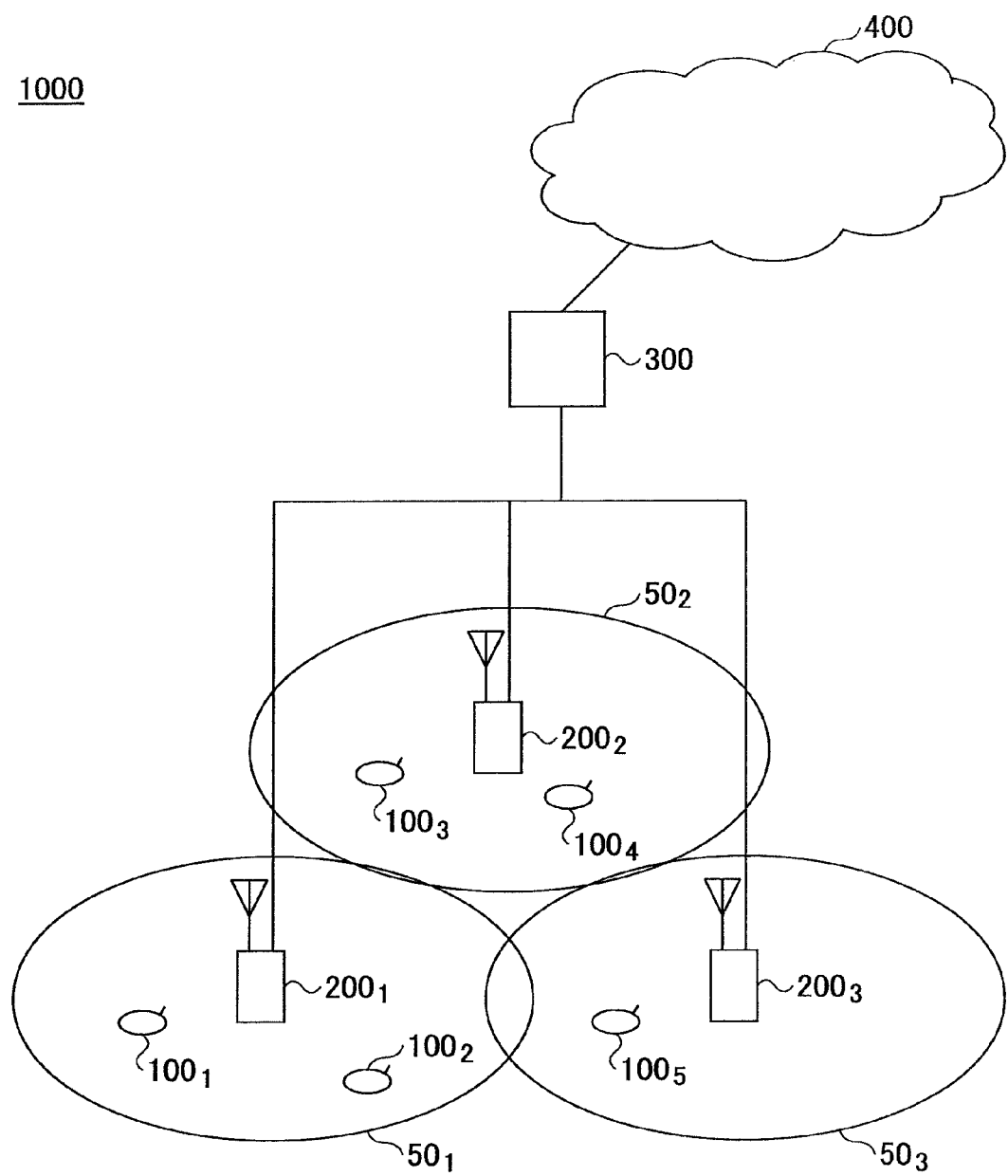
FIG. 3 is a block diagram illustrating an arrangement of a radio communication system according to one embodiment of the present invention.

A radio communication system including mobile stations and base station apparatuses according to one embodiment of the present invention is described with reference to FIG. 3.

A radio communication system 1000 may be an Evolved UTRA and UTRAN (also referred to as Long Term Evolution or Super 3G) applied system, for example. The radio communication system 1000 includes base station apparatuses (eNBs: eNode Bs) $200_m$ ($200_1$, $200_2$, $200_3$, ..., $200_m$ where m is a positive integer) and mobile stations $100_n$ ($100_1$, $100_2$, $100_3$, ..., $100_n$ where n is a positive integer) communicating with the base station apparatuses $200_m$. The base station apparatuses 200 are connected to an upper station such as an access gateway apparatus 300, which is connected to a core network 400. The mobile stations $100_n$ communicate with the base station apparatuses $200_m$ in any of cells $50_k$ ($50_1$, $50_2$, ..., $50_k$ where k is a positive integer) in accordance with Evolved UTRA and UTRAN. In this embodiment, some of the mobile stations $100_n$ establish communication channels to the base station apparatuses $200_m$ and can communicate with the base station apparatuses $200_m$, and the others do not establish any communication channel to any of the base station apparatuses and cannot communicate with the base station apparatuses $200_m$.

The base station apparatus $200_m$ transmits synchronization signals. The mobile station $100_n$ resides one of the cells $50_k$ ($50_1$, $50_2$, ..., $50_k$ where k is a positive integer) and performs cell search to detect a cell that can serve for the mobile station $100_n$ with better radio quality based on the synchronization signals at power up or at intermittent reception during communications. In other words, the mobile station $100_n$ uses the synchronization signals to detect symbol timing and frame timing as well as cell specific control information such as a cell ID (cell specific scramble codes derived from the cell ID) or a collection of cell IDs (referred to as a cell ID group hereinafter).

In this embodiment, the cell search is performed in both the cases where the mobile station $100_n$ is presently communicating and where the mobile station $100_n$ is not presently communicating. For example, the cell search for the presently communicating mobile station $100_n$ may be for detecting cells having the same frequency or cells having different frequencies. Also, for example, the cell search for the presently not-communicating mobile station $100_n$ may be for power up or standby.

The base station apparatuses $200_m$ ($200_1$, $200_2$, $200_3$, ..., $200_m$) have the same arrangement, function and state, and thus the base station $200_m$ is focused on below unless specifically stated otherwise. Also, the mobile stations $100_n$ ($100_1$, $100_2$, $100_3$, ..., $100_n$) have the same arrangement, function and state, and thus the mobile station $100_n$ is focused on below unless specifically stated otherwise. Furthermore, the cells $50_k$ ($50_1$, $50_2$, $50_3$, ..., $50_k$) have the same arrangement, function and state, and thus the cell $50_k$ is focused on below unless specifically stated otherwise.

The radio communication system 1000 uses radio access schemes OFDM and SC-FDMA in downlinks and uplinks, respectively. As stated above, in the OFDM scheme, a frequency band is segmented into multiple narrower frequency bands (subcarriers), and data is transmitted in the individual subcarriers. On the other hand, in the SC-FDMA scheme, a frequency band is segmented into some frequency bands, and the different frequency bands are assigned to individual terminals for transmission, which can reduce interference between the terminals.

Next, communication channels in Evolved UTRAN and UTRAN are described below.

For downlinks, a PDSCH (Physical Downlink Shared Channel) shared among the mobile stations $100_n$ and a LTE downlink control channel are used. In the downlinks, some information items such as mobile stations mapped to the PDSCH, associated transport format, mobile stations mapped to a PUSCH (Physical Uplink Shared Channel), associated transport format and acknowledgement for the PUSCH are transmitted in the LTE downlink control channel, and user data is transmitted in the PDSCH.

Also, the base station apparatus $200_m$ transmits synchronization signals for the mobile station $100_n$ to perform cell search in the downlinks.

For uplinks, the PUSCH (Physical Uplink Shared Channel) shared among the mobile stations $100_n$ and a LTE uplink control channel are used. The uplink control channel may include two types of channels, a channel time-multiplexed with the PUSCH and a channel frequency-multiplexed with the PUSCH.

In the uplinks, some information items such as downlink quality information (CQI: Channel Quality Indicator) used for scheduling of the PDSCH and AMC (Adaptive Modulation and Coding) and acknowledgement for the PDSCH (HARQ ACK information) are transmitted in the LTE uplink control channel. Also, user data is transmitted in the PUSCH.

Figure 4:
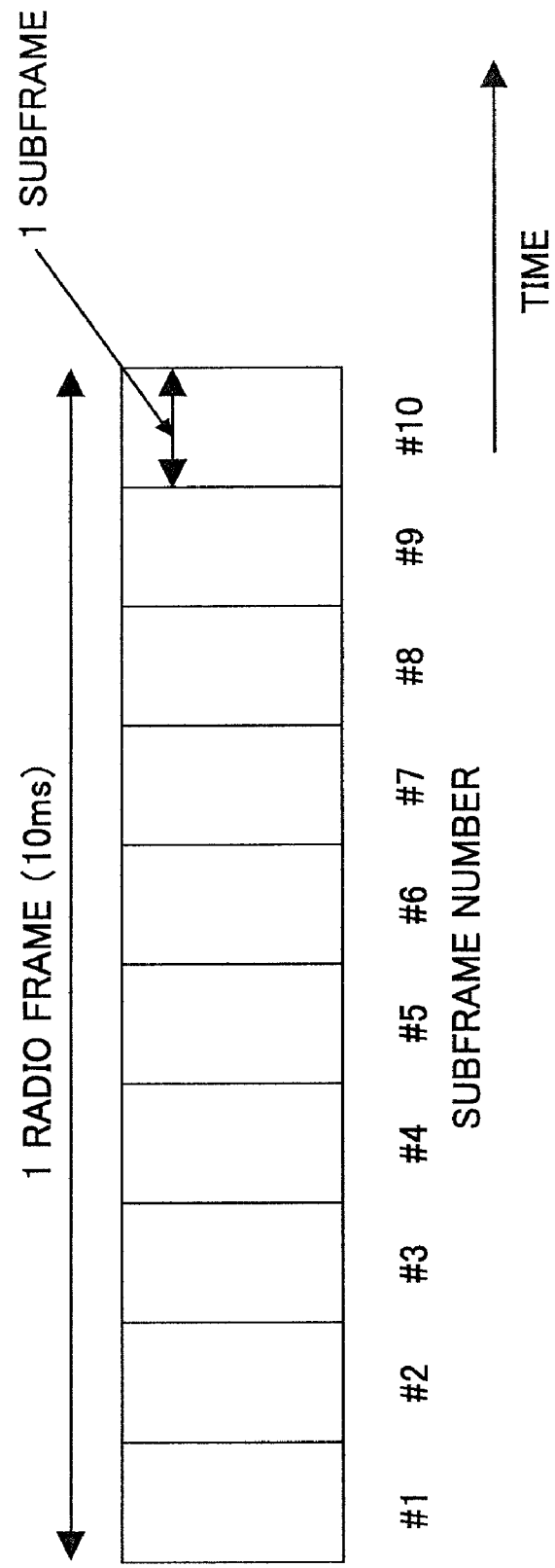
FIG. 4 schematically illustrates a radio frame structure.
Figure 5:
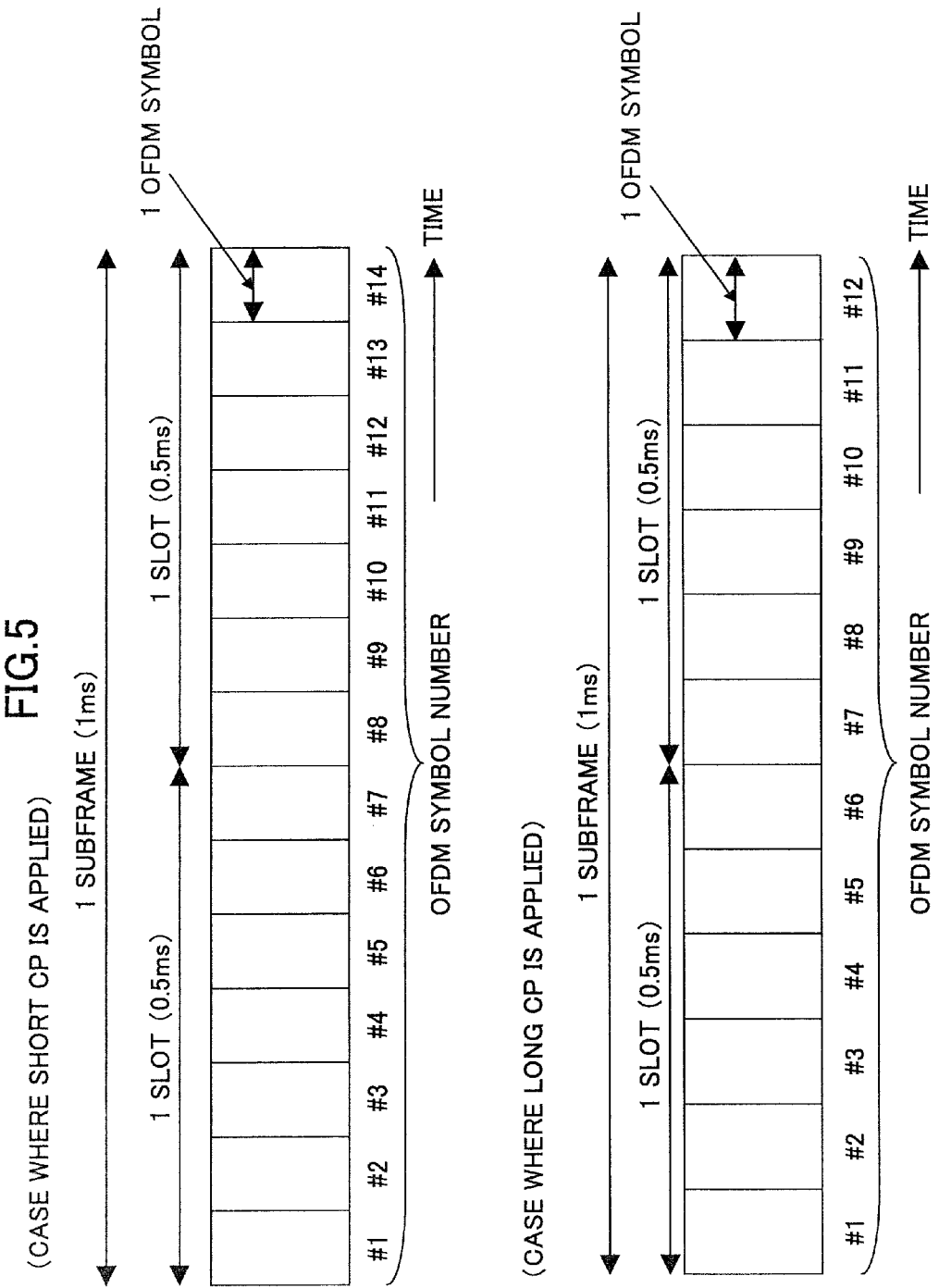
FIG. 5 schematically illustrates a subframe structure.

For downlink transmission, as illustrated in FIG. 4, one radio frame consists of 10 ms and includes ten subframes. Also, as illustrated in FIG. 5, one subframe consists of two slots, each of which includes seven OFDM symbols for short CP (upper portion of FIG. 5) and six OFDM symbols for long CP (lower portion of FIG. 5).

<Base Station Apparatus eNB>

Figure 6:
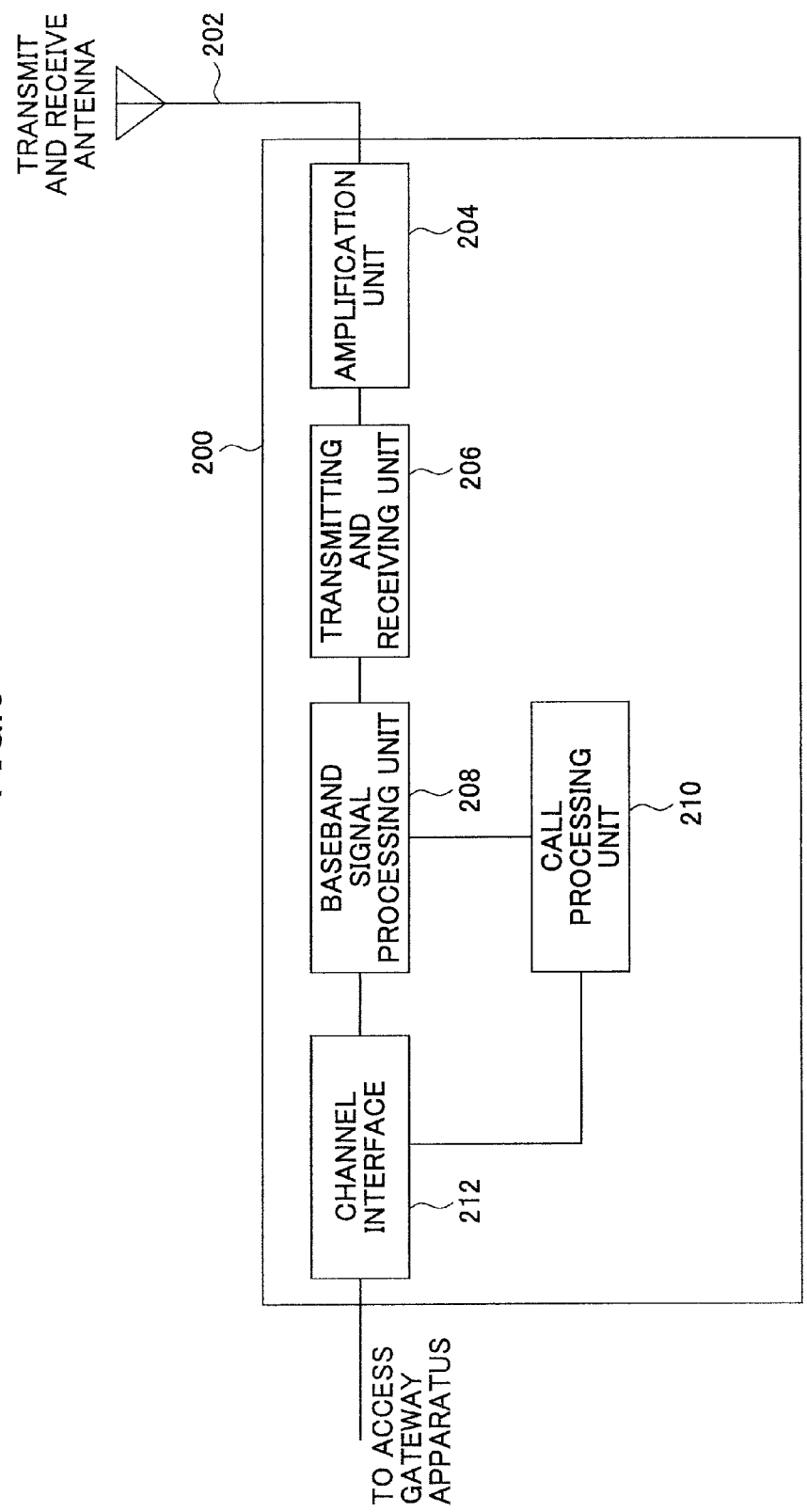
FIG. 6 is a partial block diagram illustrating a base station apparatus according to one embodiment of the present invention.

Next, the base station apparatus $200_m$ according to one embodiment of the present invention is described with reference to FIG. 6.

In this embodiment, the base station apparatus 200 includes a transmit and receive antenna 202, an amplification unit 204, a transmitting and receiving unit 206, a baseband signal processing unit 208, a call processing unit 210 and a channel interface 212.

Packet data transmitted from the base station apparatus $200_m$ to the mobile station $100_n$ in downlinks is supplied from an upper station, which serves as an upper station of the base station apparatus 200, such as an access gateway apparatus 300, to the baseband signal processing unit 208 via the channel interface 212.

In the baseband signal processing unit 208, segmentation and concatenation of the packet data, RLC layer transmission operations such as transmission operations for RLC (Radio Link Control) retransmission control, MAC retransmission control such as HARQ (Hybrid Automatic Repeat reQuest) transmission operations, scheduling, transport format selection, channel encoding and IFFT (Inverse Fast Fourier Transform) operations are conducted, and the resulting data is forwarded to the transmitting and receiving unit 206. Also, generation operations for synchronization signals are carried out in the baseband signal processing unit 208, as stated below. The synchronization signals are multiplexed into the packet data and forwarded to the transmitting and receiving unit 206.

The transmitting and receiving unit 206 conducts frequency conversion operations for converting baseband signals supplied from the baseband signal processing unit 208 into a radio frequency band. Then, the resulting signals are amplified in the amplification unit 204 and transmitted from the transmitting and receiving antenna 202. The baseband signal herein means packet data and/or synchronization signals as stated above.

On the other hand, for data transmitted from the mobile station $100_n$ to the base station apparatus $200_m$ in uplinks, radio frequency signals received via the transmit and receive antenna 202 are amplified in the amplification unit 204 and frequency-converted into baseband signals in the transmitting and receiving unit 206 for supplying to the baseband signal processing unit 208.

The baseband signal processing unit 208 performs FFT processing, error correction decoding, reception operations for MAC retransmission control and RLC layer reception operations on the incoming baseband signals and forwards the resulting signals to the access gateway apparatus 300 via the channel interface 212. The call processing unit 210 performs state management and resource assignment for the radio base station 200.

Figure 7:
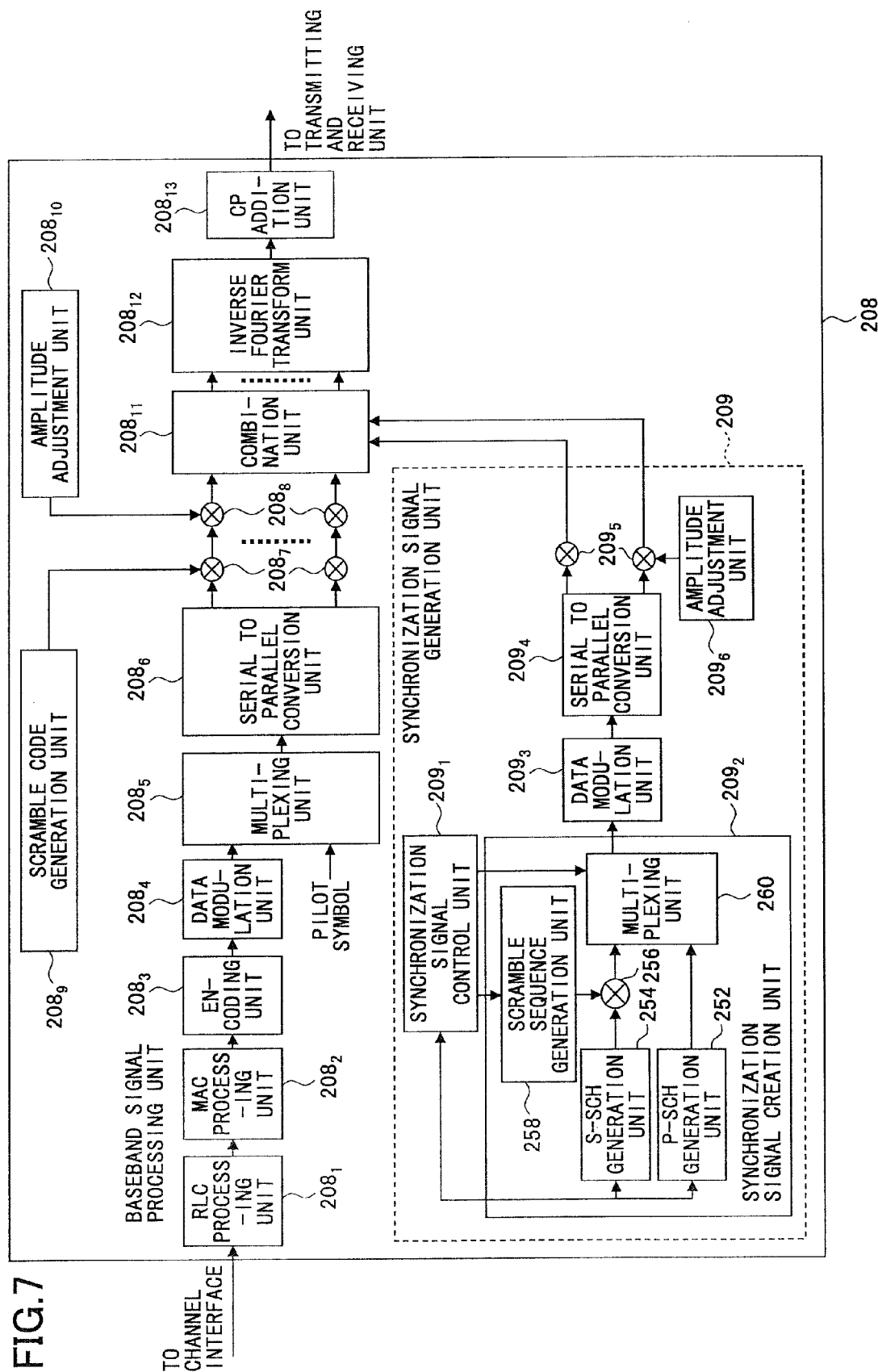
FIG. 7 is a block diagram illustrating a baseband signal processing unit in a base station apparatus according to one embodiment of the present invention.

Next, an exemplary arrangement of the baseband signal processing unit 208 is described with reference to FIG. 7. Since embodiments of the present invention mainly relate to downlinks, downlink operation related portions are illustrated in FIG. 7, and uplink operation related portions are omitted.

The baseband signal processing unit 208 includes a RLC processing unit $208_1$, a MAC (Medium Access Control) processing unit $208_2$, an encoding unit $208_3$, a data modulation unit $208_4$, a multiplexing unit $208_5$, a serial to parallel conversion unit $208_6$, multipliers $208_7$, $208_8$, a scramble code generation unit $208_9$, an amplitude adjustment unit $208_{10}$, a combination unit $208_{11}$, an IFFT (IDFT) $208_{12}$, a CP addition unit $208_{13}$ and a synchronization signal generation unit 209.

The RLC processing unit $208_1$ performs RLC layer transmission operations such as segmentation and concatenation and transmission operations for RLC retransmission control on transmitted data sequences of downlink packet data received from the channel interface. Then, the resulting data sequences are encoded by the encoding unit $208_3$ and modulated by the data modulation unit $208_4$. The multiplexing unit $208_5$ multiplexes pilot symbols into the modulated data sequences, which are serial to parallel converted by the serial to parallel conversion unit $208_6$ to generate N information symbol sequences aligned on the frequency axis. These pilot symbols may be downlink reference signals (DL-RSs), for example. For the N information symbol sequences aligned on the frequency axis, scramble codes generated by the scramble code generation unit $208_9$ are multiplied in the N respective multipliers $208_7$ in the frequency direction. Then, the scramble code multiplied symbol sequences are multiplied in the N multipliers $208_8$ with amplitude adjustment sequence values provided from the amplitude adjustment unit $208_{10}$, and the resulting symbol sequences are supplied to the combination unit $208_{11}$. The combination unit $208_{11}$ multiplexes synchronization signals generated by the synchronization signal generation unit 209 into symbol sequences having sequence length N, with which the scramble codes and the amplitude adjustment sequence values are multiplied, in relevant subcarriers of N subcarriers.

As stated below, the synchronization signal control unit $209_1$ determines subframe numbers and slot numbers for transmitting the synchronization signals. In the subframe numbers and the slot numbers for transmitting the synchronization signals, the combination unit $208_{11}$ combines the synchronization signals generated by the synchronization signal generation unit 209 with other signals (symbol sequences resulting in multiplication of downlink packet data with the scramble codes and the amplitude adjustment sequence values). In the subframe numbers and the slot numbers where no synchronization signal is transmitted, the synchronization signals generated by the synchronization signal generation unit 209 are not multiplexed. In this case, only the symbol sequences having the sequence length N resulting in multiplication of the downlink packet data with the scramble codes and the amplitude adjustment sequence values are supplied to the inverse Fourier transform unit $208_{12}$. Synchronization signal multiplexed subcarriers may be in a band including the center of the overall bandwidth, for example. Also, the bandwidth of the synchronization signal multiplexed subcarriers may be set to 1.25 MHz, for example.

The inverse Fourier transform (IFFT) unit $208_{12}$ transforms N symbols into an orthogonal multicarrier signal. The CP addition unit $208_{13}$ inserts a CP into the multicarrier signal for each Fourier targeted time period. The length of the CP (CP length) may have two types, long CP and short CP, one of which is selected for each cell.

Generation operations of synchronization signals at the synchronization signal generation unit 209 are described. The synchronization signal consists of a first synchronization signal (referred to as a primary synchronization channel or P-SCH hereinafter) and a second synchronization signal (referred to as a secondary synchronization channel or S-SCH hereinafter). The synchronization signal generation unit 209 includes a synchronization signal control unit $209_1$, a synchronization signal creation unit $209_2$, a data modulation unit $209_3$, a serial to parallel conversion unit $209_4$, a multiplier $209_5$ and an amplitude adjustment unit $209_6$. The synchronization signal creation unit $209_2$ includes a P-SCH generation unit 252, a S-SCH generation unit 254, a multiplier 256, a scramble sequence generation unit 258 and a multiplexing unit 260. The synchronization signal control unit $209_1$ is coupled to the P-SCH generation unit 252, the S-SCH generation unit 254, the scramble sequence generation unit 258 and the multiplexing unit 260 in the synchronization signal creation unit $209_2$.

The synchronization signal control unit $209_1$ determines sequence numbers of P-SCH and S-SCH as well as subframe numbers and slot numbers for transmitting the P-SCH and the S-SCH based on a cell ID or a cell ID group of one or more cells where the base station apparatus $200_m$ provides communications in the Evolved UTRA and UTRAN. For example, after identifying the cell ID group, a mobile station may identify the cell based on pilot signals, that is, signal patterns of reference signals, for example. In this case, for example, it is suggested that the reference signal pattern and the cell ID may be specified beforehand. Alternatively, the mobile station may identify the cell based on modulation and decoding of the P-SCH and the S-SCH, for example.

In this case, it is suggested that the P-SCH sequence number and the cell ID may be specified beforehand, for example. In the P-SCH, different sequences may be selected for individual sectors, for example. For example, the P-SCH for a cell consisting of three sectors may be selected from a set including three different sequences.

Then, the synchronization signal control unit $209_1$ transmits the P-SCH sequence number to the P-SCH generation unit 252 and the S-SCH sequence number to the S-SCH generation unit 254. Also, the synchronization signal control unit $209_1$ transmits the subframe number and the slot number for transmitting the P-SCH and the S-SCH as synchronization signal transmission timing information to the multiplexing unit 260.

For example, as disclosed in 3GPP TS 36.211 V1.0.0 (2007-03) and illustrated in FIG. 8, the radio communication system 1000 may define the subframe number and the slot number for transmitting the P-SCH and the S-SCH. In this example, several types of P-SCH sequences, for example, three types of P-SCH sequences, are used to transmit synchronization signals in the subframe numbers #1 and #6. Also, in the present example, since the P-SCH is mapped to the last OFDM symbol in slots, the mobile station can demodulate the P-SCH regardless of whether the long CP or the short CP is used. The reason is that the sixth OFDM symbol in the case of the long CP temporally matches the seventh OFDM symbol in the case of the short CP in the last OFDM symbol. In other words, the top and bottom timings in slots match each other even in any use of the short Cp or the long CP. In this time, the radio communication system 1000 may associate the P-SCH sequence number with the cell ID information beforehand. This association is conducted in the radio communication system 1000, which enables the synchronization signal control unit $209_1$ in the respective base station apparatuses $200_m$ to determine the P-SCH sequence number based on the cell ID for a cell where the base station apparatus $200_m$ provides communications in the Evolved UTRA and UTRAN.

In general, a communication area provided by the base station apparatus $200_m$ is divided into two or more areas. This is called sectoring. If the base station apparatus $200_m$ has multiple sectors, an area ID collectively assigned for all the sectors of the base station apparatus $200_m$ or individual sector IDs of the base station apparatus $200_m$ may be used for the above-mentioned cell ID or cell ID group. If the area ID collectively assigned to all the sectors of the base station apparatus $200_m$ is used as the cell ID or the cell ID group, combinations of the above-mentioned synchronization signal sequence and the subframe number of the slot number for transmitting the synchronization signals are set for each base station apparatus 200. If the individual sector IDs of the base station apparatus $200_m$ are used as the cell ID or the cell ID group, combinations of the above-mentioned synchronization sequence and the subframe number and the slot number for transmitting the synchronization signals are set for each sector of the base station apparatus $200_m$.

For the P-SCH sequence, a CAZAC (Constant Amplitude Zero AutoCorrelation) sequence such as a Zadoff-Chu sequence as disclosed in C. Chu, "Polyphase codes with good periodic correlation properties" (IEEE Trans. Inform. Theory, vol. II-18, pp. 531-532, July 1972), a Frank sequence as disclosed in R. L. Frank and S. A. Zadoff, "Phase shift pulse codes with good periodic correlation properties", (IRE Trans. Inform. Theory, vol. IT-8, pp. 381-382, 1962), a modulated Frank sequence as disclosed in R. L. Frank and S. A. Zadoff, "Phase shift pulse codes with good periodic correlation properties", (IRE Trans. Inform. Theory, vol. IT-8, pp. 381-382, 1962), a Golay Complementary sequence as disclosed in M. J. E. Golay, "Complementary Series", (IRE Trans. Inform. Theory, vol. 7, pp. 82-87, April 1961), a Double Repetitive Golay Complementary sequence as disclosed in 3GPP, R1-062487 Hierarchical SCH signals suitable for both (FDD and TDD) modes of E-UTRA, a PN (Pseudo Noise) sequence and/or other sequences may be used.

Also for the S-SCH sequence, a two-layer type of S-SCH sequence resulting from multiplication of a nonorthogonal or orthogonal scramble sequence with an orthogonal or nonorthogonal sequence as disclosed in 3GPP, R1-070146 "S-SCH Sequence Design" may be used. Also, a S-SCH sequence resulting from alternate arrangement of multiple orthogonal sequences and nonorthogonal sequences in a frequency domain may be used. Also, a S-SCH sequence resulting from multiplication of nonorthogonal or orthogonal scramble sequences with multiple orthogonal sequences or nonorthogonal sequences as disclosed in 3GPP R1-060042 "SCH Structure and Cell Search Method in E-UTRA Downlink" may be used. Also, a S-SCH sequence resulting from arrangement of multiple orthogonal sequences or nonorthogonal sequence in subcarriers as disclosed in 3GPP R1-071584 "Secondary Synchronization Signal Design" may be used. Also, a S-SCH sequence resulting from arrangement of multiple orthogonal sequences or nonorthogonal sequences in consecutive subcarriers and multiplication with nonorthogonal scramble sequences or orthogonal scramble sequences may be used. For the orthogonal sequence, a Walsh-Hadamard sequence, a phase rotation orthogonal sequence and/or an orthogonal M sequence may be used. For the nonorthogonal sequence, a CAZAC sequence such as a GCL sequence, a Golay sequence, a Golay Complementary sequence as disclosed in M. J. E. Golay, "Complementary Series", (IRE Trans. Inform. Theory, vol. 7, pp. 82-87, April 1961), a M sequence as disclosed in 3GPP, R1-072093 "Details on SSC Sequence Design", a PN sequence and/or other sequences may be used.

The P-SCH generation unit 252 and the S-SCH generation unit 254 generate P-SCH sequences and S-SCH sequences, respectively, based on synchronization signal sequence information and synchronization signal transmission timing information transmitted by the synchronization signal control unit $209_1$.

For example, the synchronization signal creation unit $209_2$ may layer cell specific information transmitted in the S-SCH to generate the S-SCH. The cell specific information includes at least one information item of a cell ID group, a radio frame timing and the number of transmit antennas. In this embodiment, the radio communication system 1000 may transmit a portion of the layered information as prior information in cell search by mobile stations. For example, the cell ID group may be transmitted as the prior information. Also, a portion of the cell ID group may be transmitted. Also, a radio frame timing may be transmitted. Also, the number of transmit antennas may be transmitted. Also, any information item in a combination of the cell ID group, a portion of the cell ID group, a radio frame timing and the number of transmit antennas may be included in the prior information. In this manner, a smaller number of sequences have to be detected in cell search by mobile stations.

Specifically, as illustrated in FIG. 9A, the cell ID group may be divided into several types of sequences, for example, two types of sequences each including a short code having 31 in sequence length. In the illustration, the first short code in the vertical axis represents a sequence index of the first short code in the S-SCH sequence, for example, in the case of two types of short codes each having 31 in sequence length. In the illustration, the second short code in the horizontal axis represents a sequence index of the second short code. For any of the first and second short codes, 31 sequence indices are prepared, but as mentioned above, the number of sequence indices assigned to the first and second short codes may be limited as needed.

As illustrated, the sequence index for the first short code for use in (frame) timing #1 is selected from the first numerical range (0-13). The sequence index for the second short code for use in the timing #1 is selected from the second numerical range (23-30). The sequence index for the first short code for use in timing #2 being 5 ms after timing #1 is selected from the second numerical range (23-30). The sequence index for the second short code for use in timing #2 is selected from the first numerical range (0-13).

In this manner, if the numerical ranges of the sequence indices for use in the first and second timings are not overlapped, code candidates can be reduced for searching for the respective first and second short codes, resulting in faster search. In addition, it can be rapidly determined whether the sequence index for the first short code corresponds to timing #1 at detection of the sequence index.

FIG. 9B schematically illustrates another determination method of the S-SCH sequence. In the illustrated example, the sequence indices for the first and second short codes are selected from the same numerical range (0-30). For convenience, the sequence indices for the first and second short codes are designated as m and n. In the illustration, for example, a pair of the parameters m and n is determined such that inequality $m-n \leq \Delta$ or $n-m \leq \Delta$ is satisfied. The parameters m and n are integers ranging between 0 to 30, and the parameter $\Delta$ is an integer less than or equal to 29. Compared to the example illustrated in FIG. 9A, the sequence indices are selected from a relatively broad numerical range, and thus different codes can be more freely combined for the secondary synchronization channel, which is preferred to prevent collision.

Figure 10:
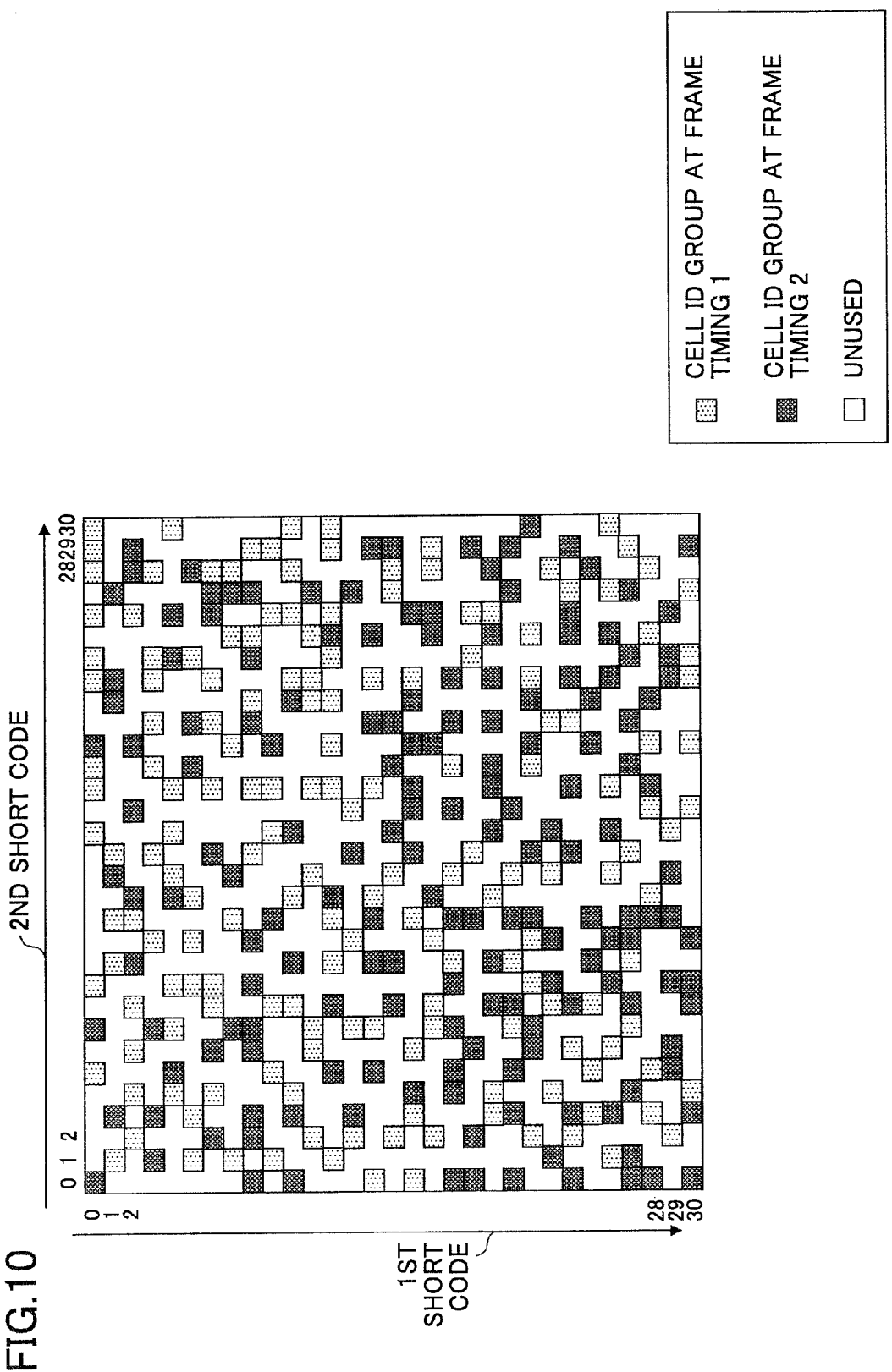
FIG. 10 illustrates another exemplary S-SCH sequence determination method.

FIG. 10 schematically illustrates another determination method of the S-SCH sequence. Also in the illustrated example, sequence indices for the first and second short codes are selected from the same numerical range (0-30). On the other hand, there is no simple regularity in FIG. 10 unlike the examples in FIGS. 9A and 9B, and various pairs of the first and second short codes are provided such that the same combinations cannot arise.

The P-SCH sequence generated by the P-SCH generation unit 252 is supplied to the multiplexing unit 260, and the S-SCH sequence generated by the S-SCH generation unit 254 is supplied to the multiplier 256. The synchronization signal control unit $209_1$ supplies information indicative of a scramble sequence to the scramble sequence generation unit 258. For example, the synchronization signal control unit $209_1$ may supply information indicative of a uniform scramble code over all cells to the scramble sequence generation unit 258. The scramble sequence generation unit 258 generates a scramble sequence based on the information indicative of the scramble sequence supplied from the synchronization signal control unit $209_1$ and supplies it to the multiplier 256. In the multiplier 256, the scramble sequence is multiplied with the S-SCH, and the multiplied S-SCH sequence is supplied to the multiplexing unit 260. As to the scramble sequence length, scrambling (spreading) may be conducted over two types of short codes while the scrambling may be conducted for each of the two types of short codes. Multiple types of scramble codes may be used to transmit some system information to the S-SCH sequence such as a frame timing, a cell ID group and the number of transmit antennas. In this manner, it is possible to reduce PAPR for the S-SCH sequence particularly in a 1.25 MHz system.

In the case where adjacent cells and/or cells within the same base station use the same S-SCH sequence, however, interference from the adjacent cells may reduce a detection likelihood of the S-SCH in user apparatuses. For this reason, it takes more time to perform cell search, resulting in degradation of the cell search time characteristics. In order to overcome this problem through randomization of interference from the adjacent cells, the synchronization signal control unit $209_1$ preferably supplies information indicative of different scramble sequences for different cells among several types of scramble codes to the scramble sequence generation unit 258. In this case, several types of scramble codes may be used as the S-SCH scramble code for different cells. Alternatively, different scramble codes may be used for different base stations. In this case, the scramble sequence generation unit 258 may generate a scramble sequence based on the information indicative of the scramble code supplied from the synchronization signal control unit 209$_1$ and supply it to the multiplier 256. The generated scramble sequence may be a P-SCH sequence specific scramble sequence associated with the P-SCH sequence number. Also, as disclosed in 3GPP, R1-072661 "Scrambling Method for Two S-SCH Short Code", a scramble sequence specific to the sequence number of one of two types of short codes may be generated. In the multiplier 256, the scramble sequence supplied from the scramble sequence generation unit 258 is multiplied with the S-SCH sequence, and the resulting sequence is supplied to the multiplexing unit 260. As to the scramble sequence length, scrambling may be performed over two types of short codes or for each of the two types of short codes. For example, the multiplied scramble sequence may be a scramble sequence specific to all cells, a scramble sequence specific to the P-SCH sequence, several types of scramble sequences and/or a scramble sequence specific to the sequence number of one of two types of short codes. Alternatively, the scramble sequence uniformly used over all the cells may be multiplied with one of two types of short codes while the scramble sequence specific to the P-SCH sequence may be multiplied with the other short code. Alternatively, the scramble sequence specific to the P-SCH sequence is multiplied with one of two types of short codes while the scramble sequence specific to the sequence number of the other short code may be multiplied with the other short code. Several types of scramble sequences may be used to transmit some system information to the S-SCH sequence such as a frame timing, a cell ID group and the number of transmit antennas. The multiplexing unit 260 multiplexes the P-SCH sequence with the scramble sequence multiplied S-SCH sequence and supplies the resulting sequence to the data modulation unit 209$_3$.

A synchronization signal sequence generated by the synchronization signal creation unit 209$_2$ is modulated by the data modulation unit 209$_3$ and serial to parallel converted by the serial to parallel conversion unit 209$_4$ into $N_{SCH}$ symbol sequences on the frequency axis. The multiplier 209$_6$ multiplies the $N_{SCH}$ symbol sequences with an amplitude adjustment sequence value supplied from the amplitude adjustment unit 209$_6$ and supplies the resulting sequence to the combination unit 208$_{11}$.

<User Apparatus UE>

Figure 11:
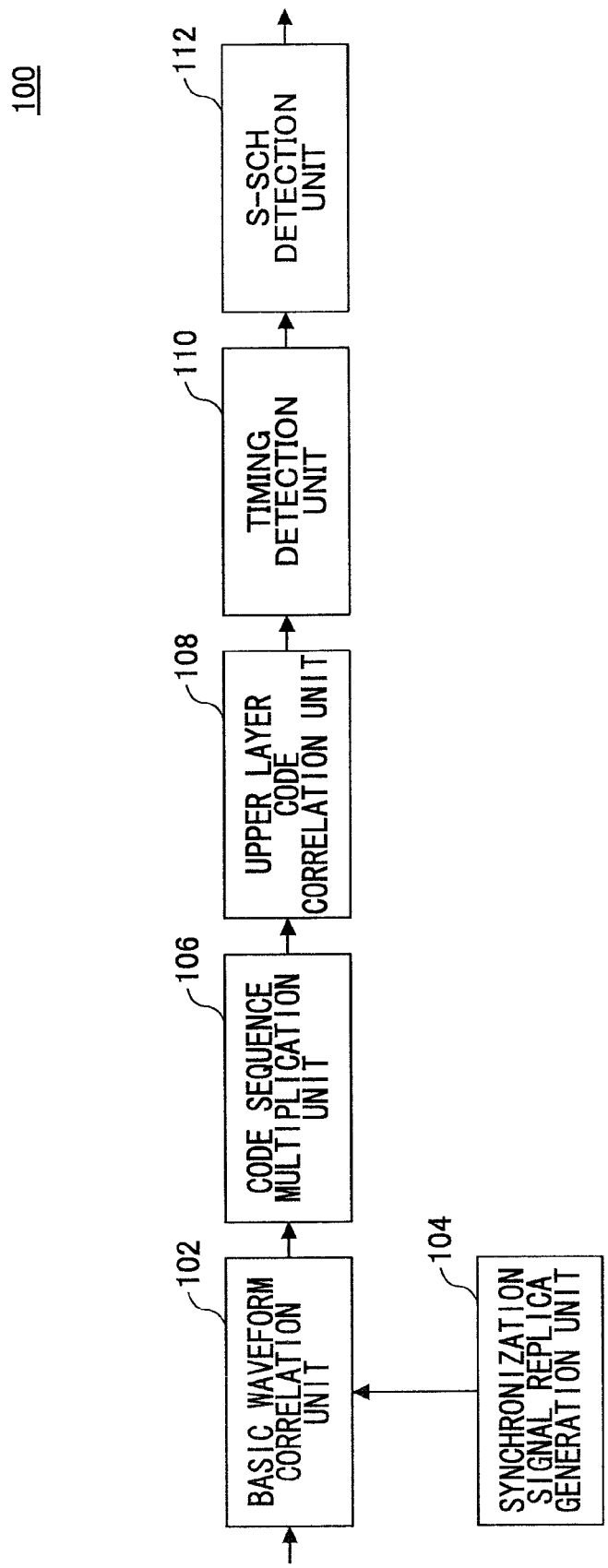
FIG. 11 is a partial block diagram illustrating a mobile station apparatus according to one embodiment of the present invention.

Next, a mobile station 100 according to the present embodiment is described with reference to FIG. 11.

The mobile station 100 includes a basic waveform correlation unit 102, a synchronization signal replica generation unit 104, a code sequence multiplication unit 106, an upper layer code correlation unit 108, a timing detection unit 110 and a S-SCH detection unit 112.

The mobile station 100 supplies multicarrier signals received via an antenna to the basic waveform correlation unit 102. On the other hand, the synchronization replica generation unit 104 generates predefined basic waveform synchronization signal replicas and supplies them to the basic waveform correlation unit 102 sequentially. The basic waveform correlation unit 102 detects correlation between the received multicarrier signals and the basic waveform synchronization signal replicas. The code sequence multiplication unit 106 multiplies (or code inverts) a code sequence with an output for a basic waveform from the basic waveform correlation unit 102. The upper layer code correlation unit 108 detects correlation between an output from the code sequence multiplication unit 106 and an upper layer code. In this manner, P-SCH replica correlation can be performed.

The timing detection unit 110 detects P-SCH timing and the P-SCH sequence number from correlation values. Upon detection of the P-SCH sequence number, the scramble sequence multiplied S-SCH sequence is descrambled. Based on the detected P-SCH timing, the S-SCH detection unit 112 detects the S-SCH by using the P-SCH as a reference signal. For example, if the cell ID group is transmitted as prior information, radio frame timing and the number of transmit antennas are detected. If scrambling is conducted in a base station, the descrambling must be performed after synchronization detection.

A specific embodiment is described.

Cell search is conducted based on the P-SCH and the S-SCH in downlink signals. The cell search is conducted based on the P-SCH sequence and the S-SCH sequence defined in the radio communication system 1000 as stated above. In other words, the cell ID or the cell ID group is detected through detection of the P-SCH sequence and the S-SCH sequence. After the detection of the cell ID, broadcast information such as a primary broadcast channel is received by using a scramble code associated with the cell ID, and the cell search ends. Details of the P-SCH sequence and the synchronization signal transmission pattern defined in the radio communication system 1000 are the same as the base station apparatus 200$_m$, and thus descriptions thereof are omitted.

For example, if the radio communication system 1000 defines the synchronization signal transmission pattern in FIG. 8 and the P-SCH sequence number is associated with the cell ID information beforehand, the timing detection unit 110 may detect synchronization channel timing and the P-SCH sequence number. Also, the S-SCH detection unit 112 may perform descrambling based on the S-SCH sequence multiplied scramble sequence, for example, and could detect cell specific information through detection of information elements in the S-SCH.

<Transmission and Reception of Synchronization Channel>

Next, a synchronization channel transmission method according to the present embodiment is described.

The S-SCH generation unit 254 selects multiple synchronization signal sequences. For example, in each of radio frame timings #1 and #2, two types of sequence, that is, a sequence including 16 short codes and having sequence length equal to 32 (first layer cell ID group indicator #1) and a sequence including 16 short codes and having sequence length equal to 32 (second layer cell ID group indicator #2), are selected. Then, the S-SCH generation unit 254 generates prior information to be transmitted to mobile stations beforehand. For example, the prior information indicative of the first layer cell ID group being a portion of information for identifying the cell ID group may be generated. The generated prior information is transmitted.

Also, the S-SCH generation unit 254 generates a secondary synchronization channel based on the selected several synchronization signal sequences. For example, the S-SCH generation unit 254 generates the secondary synchronization channel indicative of the first layer cell ID group being a portion of the information for identifying the cell ID group as well as the second layer cell ID group being a portion of the information for identifying the cell ID group. The synchronization signal control unit 209$_1$ supplies information indicative of a scramble sequence to the scramble sequence generation unit 258. For example, the synchronization signal control unit $209_1$ supplies information indicative of a scramble code used uniformly over all cells to the scramble sequence generation unit 258. Also, for example, the synchronization signal control unit $209_1$ supplies information indicative of several types of scramble codes to the scramble sequence generation unit 258. The secondary synchronization channel is supplied to the multiplier 256, which multiplies the secondary synchronization channel with the scramble sequence generated by the scramble sequence generation unit 258 for transmission.

Mobile stations detect cell specific information from the prior information and the secondary synchronization channel.

Next, a cell search method in the radio communication system 1000 according to the present embodiment is described with reference to FIG. 12.

As the first steps, a mobile station detects correlation between a primary synchronization channel sequence and a received signal and detects a carrier frequency and timing for the primary synchronization channel at steps S1102 and S1104. As a result, the sequence number of the primary synchronization channel is detected at step S1106. In the first steps, the mobile station may derive a signal phase difference and perform frequency offset compensation.

If the timing, the carrier frequency and the sequence number of the primary synchronization channel are determined, the timing and the carrier frequency of the secondary synchronization channel can be determined. Descrambling is performed for the scramble sequence multiplied secondary synchronization channel.

Next, frame timing is detected from a cell specific secondary synchronization channel sequence for use in the secondary synchronization channel at step S1108. Typically, several synchronization channels, for example, two synchronization channels, are assigned to one frame, and thus frame timing must be detected after the timing detection. Also, the cell ID group is detected from the cell specific secondary synchronization channel sequence at step S1110.

Here, for example, if a portion or all of the cell ID group is transmitted to mobile stations beforehand, candidates of specific information to be detected can be reduced, which can improve detection accuracy. As a result, the characteristics can be improved. As the prior information, for example, radio frame timing or the number of transmit antennas may be transmitted.

In the case where the base station has multiple transmit antennas, the base station may transmit the number of transmit antennas to mobile stations in the secondary synchronization channel, and the mobile stations may detect the number of transmit antennas (MIMO (Multiple Input Multiple Output) antenna information) at step S1112. Particularly, the mobile stations may detect the number of transmit antennas used for transmitting broadcast channels.

Next, the cell ID is detected by using the cell ID group detected at the second step and the primary synchronization channel sequence number detected at the first step at step S1114.

Second Embodiment

Next, a radio communication system including a mobile station and a base station apparatus according to another embodiment of the present invention is described. The radio communication system, the base station apparatus and the mobile station according to this embodiment have the same arrangements as those described in conjunction with FIGS. 3, 6, 7 and 11.

In the base station apparatus 200 according to the present embodiment, the synchronization signal control unit $209_1$ supplies information indicative of a P-SCH sequence specific scramble sequence to the scramble sequence generation unit 258 based on the P-SCH sequence number. In this case, the scramble sequence generation unit 258 generates the scramble sequence based on the information indicative of the scramble sequence supplied from the synchronization signal control unit $209_1$ and supplies it to the multiplier 256. In the multiplier 256, the P-SCH sequence specific scramble sequence is multiplied with the S-SCH sequence and supplied to the multiplexing unit 260. In this case, the P-SCH sequence number is explicitly associated with the scramble sequence number beforehand. This differs from the first embodiment where the P-SCH is not explicitly associated with the scramble sequence number. Since different sequences are selected for individual sectors in the P-SCH, different scramble sequences are multiplied with the S-SCH. For example, since the P-SCH sequence for a cell including three sectors is selected from a set including three different sequences, the scramble sequence multiplied with the S-SCH sequence is also selected from a set including three different scramble sequences.

The timing detection unit 110 in the mobile station 100 detects timing and sequence number of the P-SCH from a correlation value between outputs of the code sequence multiplication unit 106 and the upper layer code. Upon detecting the P-SCH sequence number, the S-SCH sequence multiplied with the P-SCH sequence specific scramble sequence is descrambled. Then, the S-SCH detection unit 112 detects the S-SCH based on the detected P-SCH timing by using the P-SCH as a reference signal.

Figure 12:
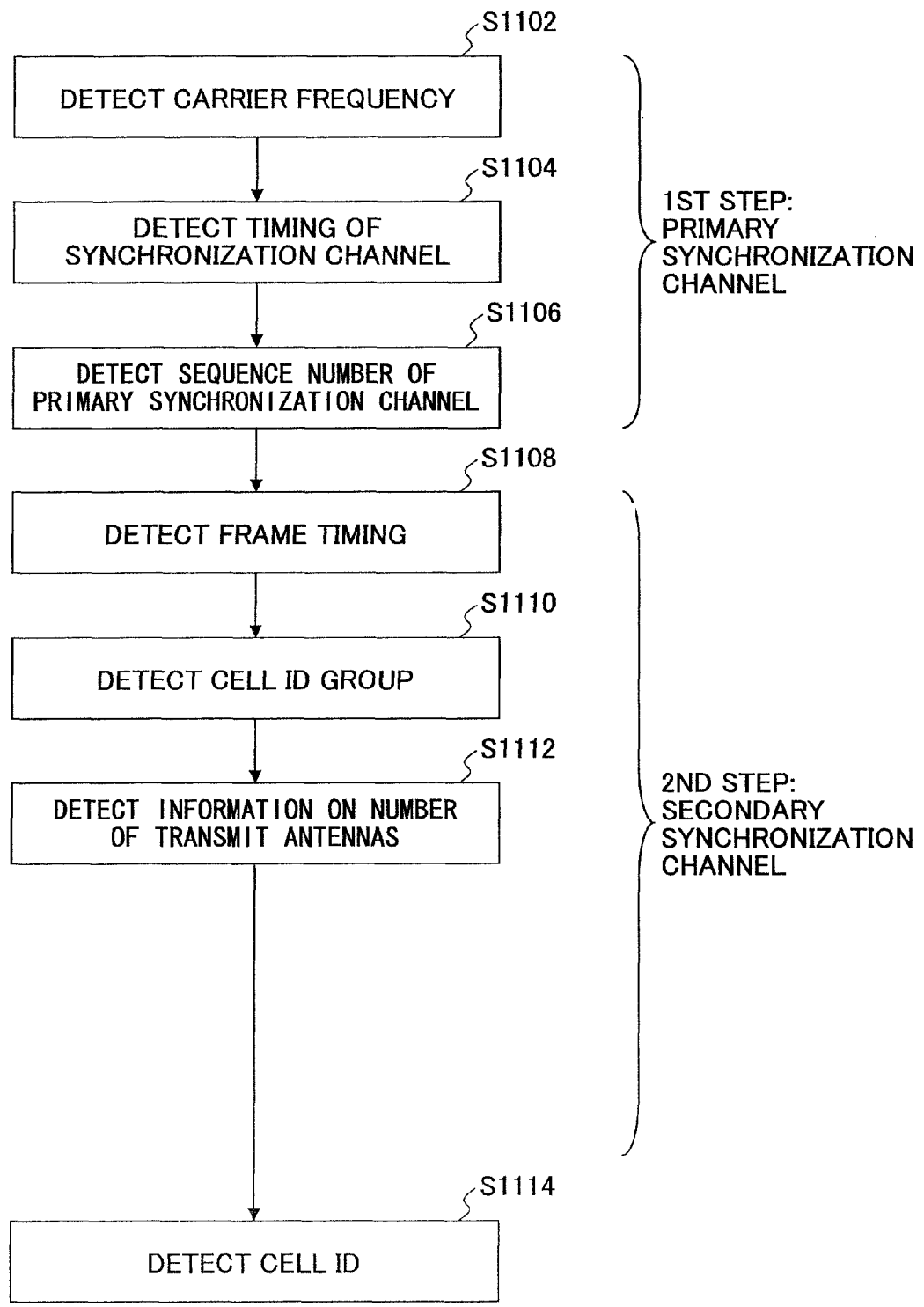
FIG. 12 is a flow diagram illustrating a cell search method according to one embodiment of the present invention.

Also in the cell search method, a primary synchronization channel sequence number is detected at step S1106 in the flow described in conjunction with FIG. 12. Based on the detected primary synchronization channel sequence number, a secondary synchronization channel specific scramble sequence multiplied with the secondary synchronization channel can be determined. Next, the secondary synchronization channel multiplied with the primary synchronization channel specific scramble sequence is descrambled. Then, the flow proceeds to step S1108.

In this manner, in the case where adjacent cells and/or cells within the same base station use the same S-SCH sequence, interference from the adjacent cells can be randomized, which can improve detection likelihood of the S-SCH. As a result, the cell search can be performed for a shorter time period, and the cell search time characteristics can be improved.

Also, in the case where channel estimation is conducted in the S-SCH detection based on the P-SCH sequence, the channel estimation can be conducted in consideration of respective channel states for cells, which can improve channel estimation accuracy. The improved channel estimation accuracy can improve detection accuracy of the S-SCH.

Also in the present embodiment, a P-SCH specific scramble sequence is applied (multiplied) to the S-SCH sequence. Unlike the first embodiment, there is a predefined correspondence between P-SCH sequences and scramble sequences, and this correspondence is known to a mobile station. The mobile station detects SCH symbol timing in the first phase of the cell search and also detects the P-SCH sequence number at the same time. Since the P-SCH sequence number has one-to-one correspondence to the S-SCH multiplied scramble sequence number, the present embodiment can identify the S-SCH scramble sequence number faster than the first embodiment based on the detected P-SCH sequence number. For this reason, several types of S-SCH scramble sequence numbers, for example, three types of S-SCH scramble sequence numbers, do not have to detected. Thus, three types of S-SCH scramble sequences can be generated in the S-SCH sequence detection without increase in computational amount.

Figure 13:
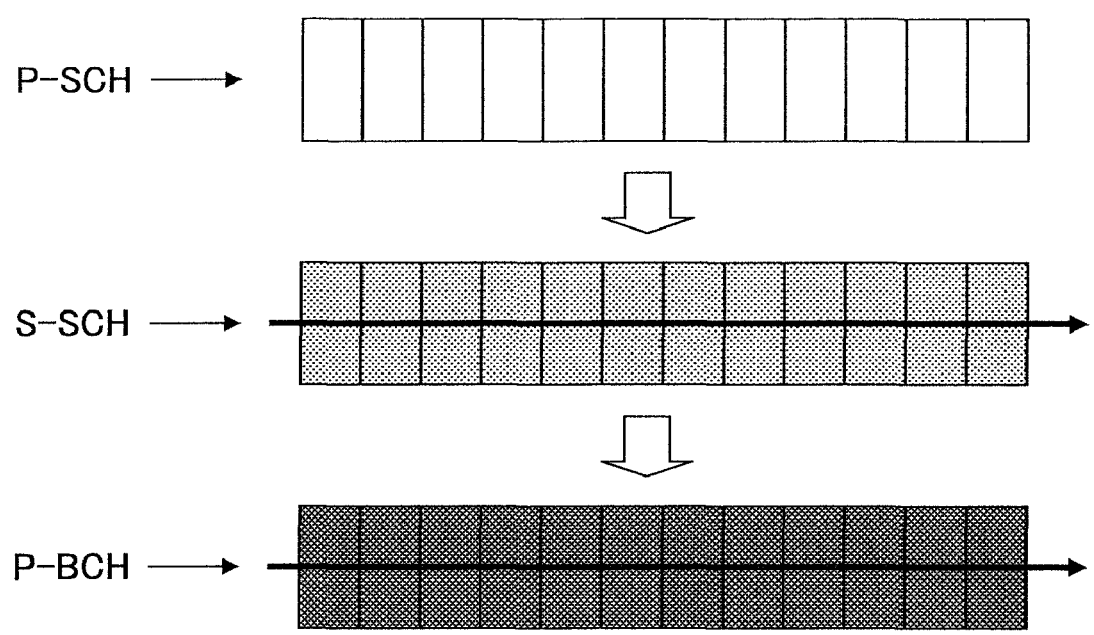
FIG. 13 schematically illustrates a scramble code generation method in a primary broadcast channel.

In addition, 510 types of scramble sequences can be generated in detection of primary-broadcast channels (P-BCHs) without increase in computational amount. As stated above, three types of scramble sequences can be used in the S-SCH sequence detection without increase in computational amount. This is described with reference to FIG. 13. The P-SCH includes three types of scramble sequences and are not scrambled. On the other hand, the S-SCH is scrambled by means of a P-SCH specific scramble sequence, for example, three types of scramble sequences. The P-BCS is scrambled by means of a cell specific scramble sequence, for example, 510 types of scramble codes. The S-SCH sequence is used to transmit 170 types of cell ID group information in an orthogonal sequence, for example, two types of short codes. For this reason, 510 types of scramble codes, which is equal to (three types of scramble sequences)×(170 types of cell ID group information), can be generated in demodulation of the P-BCH without increase in computational amount.

Also, in the case where channel estimation is conducted based on the S-SCH sequence in the P-BCH demodulation, the channel estimation can be conducted in consideration of respective channel states for individual cells, which can improve channel estimation accuracy. The improved channel estimation accuracy can improve demodulation accuracy of the P-BCH.

Third Embodiment

FIG. 14 illustrates some differences among a conventional example, the first, the second and the third embodiments as described below. In the conventional example, primary synchronization channels $P_1$, $P_2$, $P_3$ are transmitted as P-SCHs in sectors 1, 2, 3, respectively. For example, if three sectors are provided for one base station as illustrated, the different P-SCHs are used for the individual sectors, and thus a user apparatus can determine a resident sector and acquire a channel estimation value in the resident sector. This feature is similar to the embodiments. In the conventional example, information ($SE_i$ where i is a parameter for identifying the cells) indicative of different secondary synchronization channels for the individual cells is provided, and the same secondary synchronization channel $SE_i$ is transmitted in the sectors belonging to the same base station. As stated above, transmissions of the same signals in adjacent sectors may reduce detection likelihood of the S-SCH near a sector boundary.

In the first and second embodiments, a scramble code $SC_j$, which is different for each sector, is multiplied with the information $SE_i$ indicative of the secondary synchronization channel. Even in the case of the same $SE_i$ being used for all the sectors, if the different scramble codes $SC_j$ are used for the individual sectors, $SC_1 \times SE_i$, $SC_2 \times SE_i$ and $SC_3 \times SE_i$ would be different from each other. Thus, the different S-SCHs can be transmitted for the individual sectors and be demodulated even near sector boundaries with high accuracy. In the second embodiment, primary synchronization channels $P_i$, which are different from each other for the individual sectors, are associated with the scramble codes $SC_i$ being different from each other for the individual sectors, and the association is known to the user apparatus. Thus, the S-SCH can be demodulated rapidly after confirmation of the primary synchronization channel P-SCH.

Since scramble codes are used in the first and second embodiments, some codes ($SE_i$) multiplied with the scramble codes must be present. In the present invention, however, the two types of codes ($SC_i$ and $SE_i$) do not have to be present. In the third embodiment of the present invention, different generation polynomial equations $Q_1(X)$, $Q_2(X)$, $Q_3(X)$ are associated with the primary synchronization channels $P_1$, $P_2$, $P_3$ being different from each other for the individual sectors. The generation polynomial equation $Q_i(X)$ may be a polynomial equation for generating codes such as $X^5+X^2+1$, for example. Although any suitable sequence may be generated though the generation polynomial equation, the generated sequence may be preferably a linear feedback shift register (LSFR) sequence and more preferably a M sequence. For example, it is assumed that the generation polynomial equation $Q_1(X)$ corresponding to the primary synchronization channel $P_1$ in the first sector corresponds to a polynomial equation for generating a M sequence having code length equal to 31. In this assumption, several of any one of 31 code sequences that can be generated by the generation polynomial equation $Q_1(X)$ are combined and used for the S-SCH in the first sector. Similarly, several of any one of 31 code sequences that can be generated by the generation polynomial equation $Q_2(X)$ are combined and used for the S-SCH in the second sector, and several of any one of 31 code sequences that can be generated by the generation polynomial equation $Q_3(X)$ are combined and used for the S-SCH in the third sector. The user apparatus identifies the primary synchronization channel P-SCH and determines a resident sector. Then, the user apparatus identifies a generation polynomial equation such as $Q_1(X)$ for use in the resident sector based on the correspondence as illustrated in the lower-right portion in FIG. 14. Subsequently, the user apparatus determines which code of the 31 codes that can be derived from the generation polynomial equation $Q_1(X)$ is actually used for the S-SCH through comparison with received signals. The P-SCH ($P_i$) has one-to-one correspondence to the generation polynomial equation $Q_i(X)$, and thus if the user apparatus can determine the resident sector, the user apparatus does not have to consider codes that can derived from generation polynomial equations for use in other sectors. The user apparatus only has to consider the codes that can be derived from the generation polynomial equation corresponding to one of the P-SCHs. Although it is illustrated that only one generation polynomial equation corresponds to one sector for simplicity, a combination of several generation polynomial equations may correspond to one sector. In this case, other combinations of several generation polynomial equations may correspond to other sectors.

Figure 15:
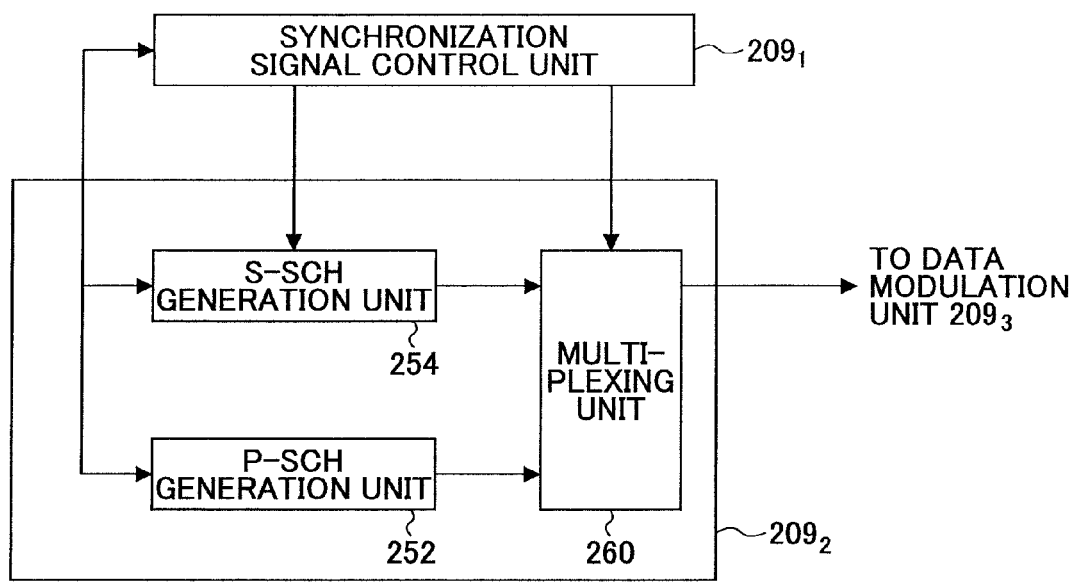
FIG. 15 illustrates a variation of a synchronization signal generation unit.

FIG. 15 illustrates a portion of a base station apparatus for use in the third embodiment. The illustration relates to the synchronization signal control unit $209_1$ and the synchronization signal creation unit $209_2$. Although the illustration in FIG. 15 is similar to FIG. 7, the scramble sequence generation unit 258 and the multiplier 256 are not illustrated in that the present embodiment does not use scramble codes. Even in the present embodiment, however, the scramble codes can be used. For example, if the same scramble code is used over all sectors, the scramble code is multiplied in the S-SCH generation unit 254. Also, as disclosed in 3GPP R1-072661 "Scrambling Method for Two S-SCH Short Code", a scramble code associated with the sequence number for the first short code in two types of short codes in the S-SCH sequence may be multiplied with the second short code in the S-SCH generation unit 254. The synchronization signal control unit $209_1$ manages the correspondence between the primary synchronization channel P-SCH and the generation polynomial equation $Q_i(X)$. The S-SCH generation unit 254 generates a secondary synchronization channel in accordance with instructions from the synchronization signal control unit $209_1$ and supplies it to the multiplexing unit 250. In this embodiment, the S-SCH generation unit 254 generates codes based on the generation polynomial equation $Q_i(X)$ specified by the synchronization signal control unit $209_1$ and supplies codes actually used as the S-SCH to the multiplexing unit 260. Subsequently, synchronization channels including the S-SCH are transmitted to the data modulation unit $209_3$ and processed in accordance with the above-mentioned operations to transmit over the air.

In the above-mentioned embodiments, Evolved UTRA and UTRAN (also referred to as Long Term Evolution or Super 3G) applied systems have been illustratively described, but the mobile station apparatus, the base station apparatus and the synchronization channel transmission method according to the present invention can be applied to all systems using the OFDM scheme for downlinks.

For convenience, the embodiments have been described with use of specific numerical examples to facilitate understandings of the present invention, but the numerical examples are simply illustrative unless specifically stated otherwise, and any other appropriate value may be used.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2007-211593 filed on Aug. 14, 2007, the entire contents of which are hereby incorporated by reference.

The invention claimed is:

1. A base station apparatus, comprising:
 a generation unit configured to generate a synchronization channel including a primary synchronization channel and a secondary synchronization channel; and
 a transmitting unit configured to wirelessly transmit a signal including the synchronization channel,
 wherein in the generation unit, multiple types of primary synchronization channels are defined corresponding to respective sequence numbers of the primary synchronization channels, and the secondary synchronization channel includes a code derived from generation polynomial equations predefined corresponding to the respective sequence numbers of the primary synchronization channels.

2. The base station apparatus as claimed in claim 1, wherein the generation unit uses a code corresponding to a sector.

3. The base station apparatus as claimed in claim 2, wherein the code derived from the predefined generation polynomial equations belongs to a linear feedback shift register (LFSR) sequence.

4. The base station apparatus as claimed in claim 3, wherein the code derived from the predefined generation polynomial equations comprises a M sequence.

5. The base station apparatus as claimed in claim 4, wherein a cell ID group and a radio frame timing are identified by identifying the secondary synchronization channel.

6. The base station apparatus as claimed in claim 3, wherein a cell ID group and a radio frame timing are identified by identifying the secondary synchronization channel.

7. The base station apparatus as claimed in claim 2, wherein a cell ID group and a radio frame timing are identified by identifying the secondary synchronization channel.

8. The base station apparatus as claimed in claim 1, wherein the code derived from the predefined generation polynomial equations belongs to a linear feedback shift register (LFSR) sequence.

9. The base station apparatus as claimed in claim 8, wherein the code derived from the predefined generation polynomial equations comprises a M sequence.

10. The base station apparatus as claimed in claim 9, wherein a cell ID group and a radio frame timing are identified by identifying the secondary synchronization channel.

11. The base station apparatus as claimed in claim 8, wherein a cell ID group and a radio frame timing are identified by identifying the secondary synchronization channel.

12. The base station apparatus as claimed in claim 1, wherein a cell ID group and a radio frame timing are identified by identifying the secondary synchronization channel.

13. A transmitting method, comprising:
 generating a synchronization channel including a primary synchronization channel and a secondary synchronization channel; and
 wirelessly transmitting a signal including the synchronization channel, wherein in the generating step, multiple types of primary synchronization channels are defined corresponding to respective sequence numbers of the primary synchronization channels, and the secondary synchronization channel includes a code derived from generation polynomial equations predefined corresponding to the respective sequence numbers of the primary synchronization channels.

14. The method as claimed in claim 13, wherein the generating step comprises using a code corresponding to a sector.

15. The method as claimed in claim 14, wherein the code derived from the predefined generation polynomial equations belongs to a linear feedback shift register (LFSR) sequence.

16. The method as claimed in claim 15, wherein the code derived from the predefined generation polynomial equations comprises a M sequence.

17. The method as claimed in claim 16, wherein a cell ID group and a radio frame timing are identified by identifying the secondary synchronization channel.

18. The method as claimed in claim 15, wherein a cell ID group and a radio frame timing are identified by identifying the secondary synchronization channel.

19. The method as claimed in claim 14, wherein a cell ID group and a radio frame timing are identified by identifying the secondary synchronization channel.

20. The method as claimed in claim 13, wherein the code derived from the predefined generation polynomial equations belongs to a linear feedback shift register (LFSR) sequence.

21. The method as claimed in claim 20, wherein the code derived from the predefined generation polynomial equations comprises a M sequence.

22. The method as claimed in claim 21, wherein a cell ID group and a radio frame timing are identified by identifying the secondary synchronization channel.

23. The method as claimed in claim 20, wherein a cell ID group and a radio frame timing are identified by identifying the secondary synchronization channel.

24. The method as claimed in claim 13, wherein a cell ID group and a radio frame timing are identified by identifying the secondary synchronization channel.

25. A radio communication system, comprising:
a base station apparatus configured to wirelessly transmit a synchronization channel including a primary synchronization channel and a secondary synchronization channel; and
a user apparatus configured to receive the synchronization channel from the base station apparatus, wherein
in the base station apparatus, multiple types of primary synchronization channels are defined corresponding to respective sequence numbers of the primary synchronization channels, and the secondary synchronization channel includes a code derived from generation polynomial equations predefined corresponding to the respective sequence numbers of the primary synchronization channels.

\* \* \* \* \*